(12) United States Patent
Steele, Jr. et al.

(10) Patent No.: US 6,567,856 B1
(45) Date of Patent: May 20, 2003

(54) DEADLOCK-FREE ROUTING

(75) Inventors: Guy L. Steele, Jr., Lexington, MA (US); Steven K. Heller, Chelmsford, MA (US); Daniel Cassiday, Topsfield, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/323,696

(22) Filed: Jun. 2, 1999

(51) Int. Cl.⁷ .......................................... G06F 15/173
(52) U.S. Cl. ..................... 709/238; 710/260; 710/268; 709/242; 709/244; 709/239
(58) Field of Search .............................. 709/238, 242, 709/239, 240, 235, 244; 710/260, 268

(56) References Cited

U.S. PATENT DOCUMENTS

| | | | | |
|---|---|---|---|---|
| 5,128,932 A | * | 7/1992 | Li ................................ | 370/236 |
| 5,453,978 A | * | 9/1995 | Sethu et al. ................. | 370/254 |
| 5,602,839 A | * | 2/1997 | Annapareddy et al. ...... | 370/405 |
| 5,680,116 A | * | 10/1997 | Hashimoto et al. .......... | 340/2.4 |
| 5,721,819 A | * | 2/1998 | Galles et al. ................ | 709/242 |
| 5,740,346 A | * | 4/1998 | Wicki et al. ................. | 395/182 |
| 5,751,967 A | | 5/1998 | Raab et al. | |
| 5,768,501 A | | 6/1998 | Lewis | |
| 5,781,546 A | * | 7/1998 | Sethu .......................... | 709/243 |
| 5,812,549 A | * | 9/1998 | Sethu .......................... | 370/389 |
| 5,859,981 A | * | 1/1999 | Levin et al. ................. | 709/200 |
| 5,874,964 A | | 2/1999 | Gille | |
| 5,884,047 A | * | 3/1999 | Aikawa et al. .............. | 709/238 |
| 5,914,953 A | * | 6/1999 | Krause et al. ............... | 370/392 |
| 5,970,232 A | * | 10/1999 | Passint et al. ............... | 370/351 |
| 6,005,860 A | * | 12/1999 | Anderson et al. ............ | 370/352 |
| 6,031,835 A | * | 2/2000 | Abali et al. ................. | 370/388 |
| 6,055,618 A | * | 4/2000 | Thorson ...................... | 370/254 |
| 6,064,671 A | * | 5/2000 | Killian ........................ | 370/389 |
| 6,097,718 A | * | 8/2000 | Bion ........................... | 370/351 |
| 6,137,781 A | * | 10/2000 | Goto et al. .................. | 370/255 |
| 6,230,252 B1 | * | 5/2001 | Passint et al. ............... | 709/238 |
| 6,243,760 B1 | * | 6/2001 | Armbruster et al. ......... | 709/201 |
| 6,256,295 B1 | | 7/2001 | Callon | |
| 6,295,573 B1 | * | 9/2001 | Bailey et al. ................ | 710/260 |

OTHER PUBLICATIONS

Whay C. Lee, "Topology Aggregation for Hierarchical Routing in ATM Networks." Apr. 1, 1995, pp. 82–92, Computer–Communication Review.

IBM, "Clustering Algorithm for Computer Network Management Graphics," Jun. 1988, pp. 71–79, IBM Technical Disclosure Bulletin, vol. 31, No. 1.

Peercy, M. et al., "Distributed Algorithms for Shortest–Path, Deadlock–Free Routing and Broadcasting in Arbitrarily Faulty Hypercubes," International Symposium on Fault Tolerant Computing Systems (FTCS), US, Los Alamitos, IEEE Comp. Soc. Press, vol. Symp. 20, Jun. 26, 1990, pp. 218–225.

(List continued on next page.)

*Primary Examiner*—James P. Trammell
*Assistant Examiner*—Firmin Backer
(74) *Attorney, Agent, or Firm*—Finnegan, Henderson, Farabow, Garrett & Dunner, L.L.P.

(57) ABSTRACT

In accordance with methods and systems consistent with the present invention, an improved deadlock-free routing system is provided to a family of network topologies where both the configuration of the networks and the routings are designed to optimize performance. In this system, each network utilizes static routing tables that perform deadlock-free routing in an optimized manner to reduce the amount of communication overhead when routing traffic. Specifically, the routings in accordance with methods and systems consistent with the present invention require no more than two hops for networks up to a size of 16 nodes. As a result, the deadlock-free routing provided in accordance with methods and systems consistent with the present invention incurs less communications overhead than some conventional systems while still avoiding deadlock.

10 Claims, 15 Drawing Sheets

OTHER PUBLICATIONS

Fleury, E. et al., "A General Theory for Deadlock Avoidance in Wormhole–Routed Networks," IEEE Trans. on Parallel and Distributed Systems, IEEE Inc., NY, vol. 9, No. 7, Jul. 1, 1998, pp. 626–638.

Pifarre G. D. et al., "Adaptive Deadlock–and Livelock–Free Routing in the Hypercube Network," IEEE Trans. on Parallel and Distributed Systems, IEEE Inc., NY, vol. 5, No. 11, Nov. 1, 1994, pp. 1121–1138.

* cited by examiner $2^1 = 2$ $2^2 = 4$ $2^3 = 8$ $2^4 = 16$

DEADLOCK-FREE ROUTING

RELATED APPLICATIONS

The following identified U.S. patent applications are relied upon and are incorporated by reference in this application.

U.S. patent application Ser. No. 09/323,963, entitled "Improved Network Topologies," filed on even date herewith, assigned to a common assignee.

U.S. patent application Ser. No. 09/323,964, entitled "Dynamic Generation of Deadlock-Free Routings," filed on Jun. 2, 1999.

U.S. patent application Ser. No. 09/323,965, entitled "Recursive Partitioning of Networks," filed on even date herewith, assigned to a common assignee.

U.S. patent application Ser. No. 09/323,962, entitled "Improved Network Reconfiguration," filed on even date herewith, assigned to a common assignee.

FIELD OF THE INVENTION

The present invention relates generally to data processing systems and, more particularly, to deadlock-free routing.

BACKGROUND OF THE INVENTION

Networks comprise a number of nodes that are interconnected via links. As used herein, the term "node" refers to any device capable of communicating, such as a computer, router, switch, network processor, or symmetric multi-processor. The specific configuration of nodes and links in a network is referred to as the "network topology."

Each node routes network traffic by interacting with internal buffers that store packets. Specifically, each of a node's links typically has an associated buffer ("receive buffer") that temporarily stores packets received via the link, and each of a node's links typically has an associated buffer ("send buffer") that temporarily stores packets before they are sent across the link. When a packet is received by a node that is not its destination, the packet arrives in one of the node's receive buffers. The node then determines which link to send the packet over using a routing algorithm. After the appropriate link is selected, the packet is stored in that link's send buffer for transmission. However, sometimes the node at the other end of the selected link is busy; in which case, the receive buffer for the link may be full. Thus, the packet cannot be sent and remains in the send buffer until the other node's receive buffer is emptied. As a result, network traffic can form congestion which can lead to deadlock.

Deadlock occurs when a cycle of multi-hop packets are each waiting on a busy node on the next hop. A "multi-hop" packet refers to a packet that is routed through at least one node before reaching its destination. A deadlock may occur, for example, in a network of three nodes (node 1, node 2 and node 3), where node 1 is waiting to send a multi-hop packet to node 2 (which is not the packet's destination), where node 2 is waiting to send a multi-hop packet to node 3 (which is not the packet's destination), and where node 3 is waiting to send a multi-hop packet to node 1 (which is not the packet's destination). Since each node is waiting on the other, a statement or deadlock occurs, and these nodes are rendered nonoperational.

To prevent deadlock from occurring, some networks have been developed that route traffic using predefined calculations. One family of networks that routes traffic in this way includes the hypercube networks depicted in FIG. 1A. The hypercube family of networks are configured according to a predefined pattern. The hypercube networks accommodate only networks with a number of nodes that can be expressed as a power of 2. Accordingly, FIG. 1A depicts the hypercube networks having 2, 4, 8, and 16 nodes. The pattern that the hypercube networks follow is apparent from an examination of the different topologies.

To prevent deadlock in the hybercube networks, routing is performed using predefined calculations. For example, FIG. 1B depicts an example of a hypercube network of 8 nodes that performs this type of routing. Each node of the network is associated with a binary number (e.g., 010). When routing a packet through the network, each node performs a calculation to determine to which node to send the packet. According to this calculation, the number of the current node is compared to the number of the destination node of the packet to find the most significant bit that differs. The packet is then forwarded to a node whose number differs from the number of the current node in exactly that bit position. For example, node 000 will send a packet destined for node 111 to node 100 instead of 010 or 001, because the third bit position (from the right) is the most significant. This calculation is performed at each node until the destination node is reached. Use of this calculation on each node prevents deadlock by preventing a cycle from occurring in the network. That is, there are no sequences of multi-hop packets that form a cycle. However, configuring the networks using a predefined pattern and using the predefined calculations to perform routing leads to inefficient routing, because little attention is given to optimizing either the network topology or the routing to reduce communications overhead. For example, traffic routed from node 000 to node 111 must take 3 hops: starting at 000 and traveling to 100, to 110, and then to 111. It is thus desirable to improve network configuration and routing to reduce communication overhead.

SUMMARY OF THE INVENTION

In accordance with methods and systems consistent with the present invention, an improved deadlock-free routing system is provided to a family of network topologies where both the configuration of the networks and the routings are designed to optimize performance. In this system, each network utilizes static routing tables that perform deadlock-free routing in an optimized manner to reduce the amount of communication overhead when routing traffic. Specifically, the routings in accordance with methods and systems consistent with the present invention require no more than two hops for networks up to a size of 16 nodes. As a result, the deadlock-free routing provided in accordance with methods and systems consistent with the present invention incurs less communications overhead than some conventional systems while still avoiding deadlock.

In accordance with methods consistent with the present invention, a method is provided in a network containing nodes. According to this method, a first of the nodes receives a packet from a second of the nodes, accesses a statically-defined routing table to determine a third of the nodes to send the packet to such that a deadlock is avoided, and sends the packet to the third node.

In accordance with systems consistent with the present invention, a computer-readable memory device encoded with a routing table data structure for use in routing traffic in the network of nodes is provided. The routing table data structure comprises an entry indicating a next node for sending a received packet in such a manner as to avoid deadlock.

In accordance with systems consistent with the present invention, a distributed system with nodes and links interconnecting the nodes is provided. Each node contains a static routing table for use in routing a packet received from a first of the nodes to a second of the nodes to avoid deadlock.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

In accordance with methods and systems consistent with the present invention, an improved technique for deadlock-free routing is provided. According to this technique, pre-configured routing tables are used to optimize routing in a network while avoiding a deadlock. These routing tables have been empirically selected to reduce communications overhead while still preventing deadlock.

These routing tables are provided in a family of network topologies which have been selected to facilitate network performance. These network topologies are discussed below, and they are also discussed in further detail in copending U.S. patent application Ser. No. 09/323,963 entitled "Improved Network Topologies," which has been previously incorporated by reference. In addition to being selected for network performance characteristics, these network topologies have been selected to facilitate reconfiguration as is further described in copending U.S. patent application Ser. No. 09/323,962 entitled "Improved Network Reconfiguration," which has been previously incorporated by reference.

IMPLEMENTATION DETAILS

Figure 1A:
FIG. 1A depicts the hypercube family of networks.
Figure 1A:
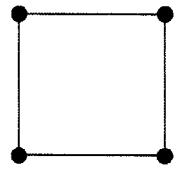
Figure 1A:
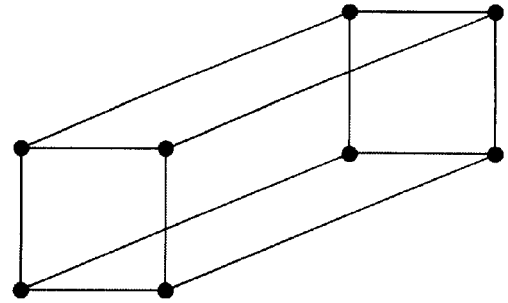
Figure 1A:
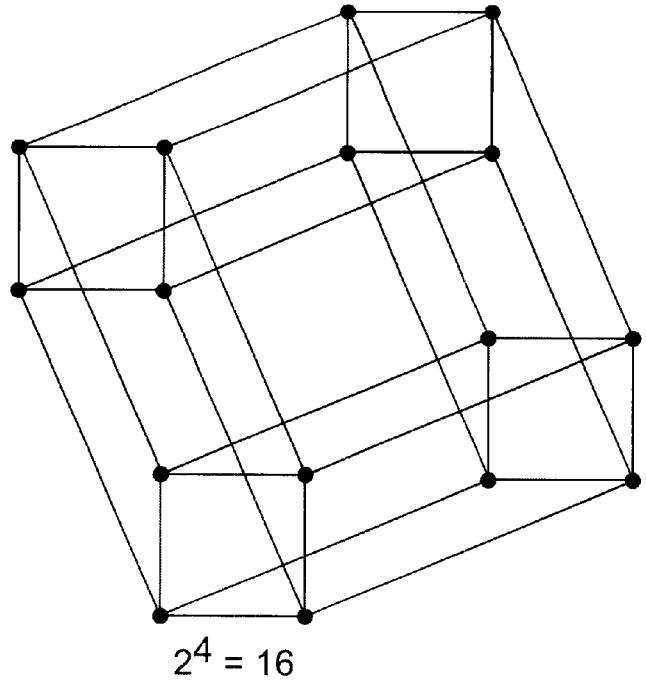
Figure 1B:
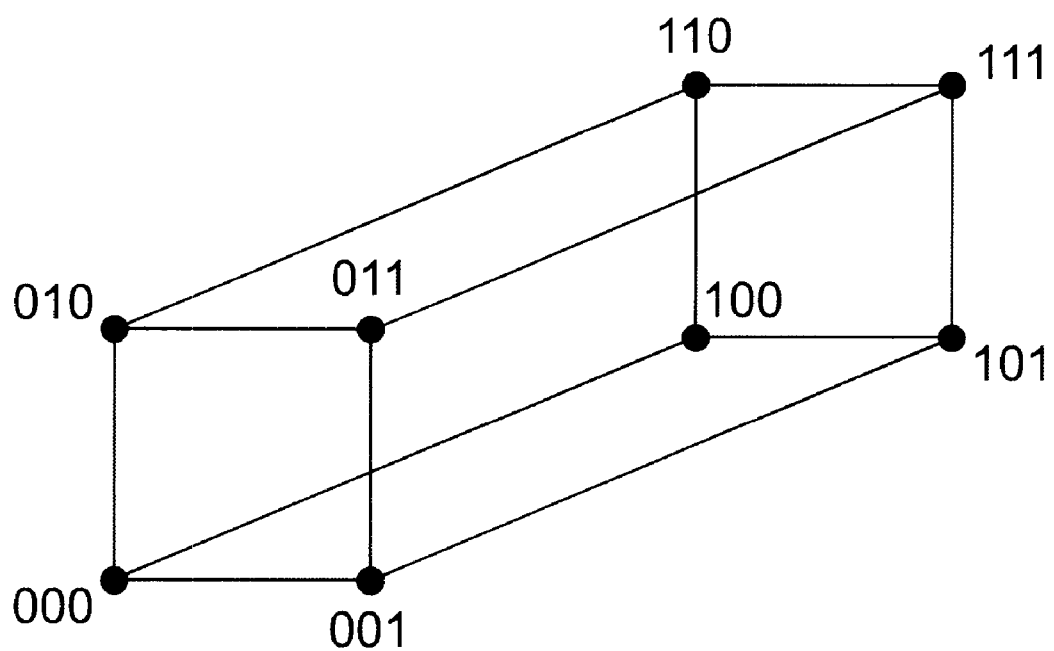
FIG. 1B depicts the hypercube network with eight nodes from FIG. 1A where its nodes are numbered as part of its routing algorithm.
Figure 2:
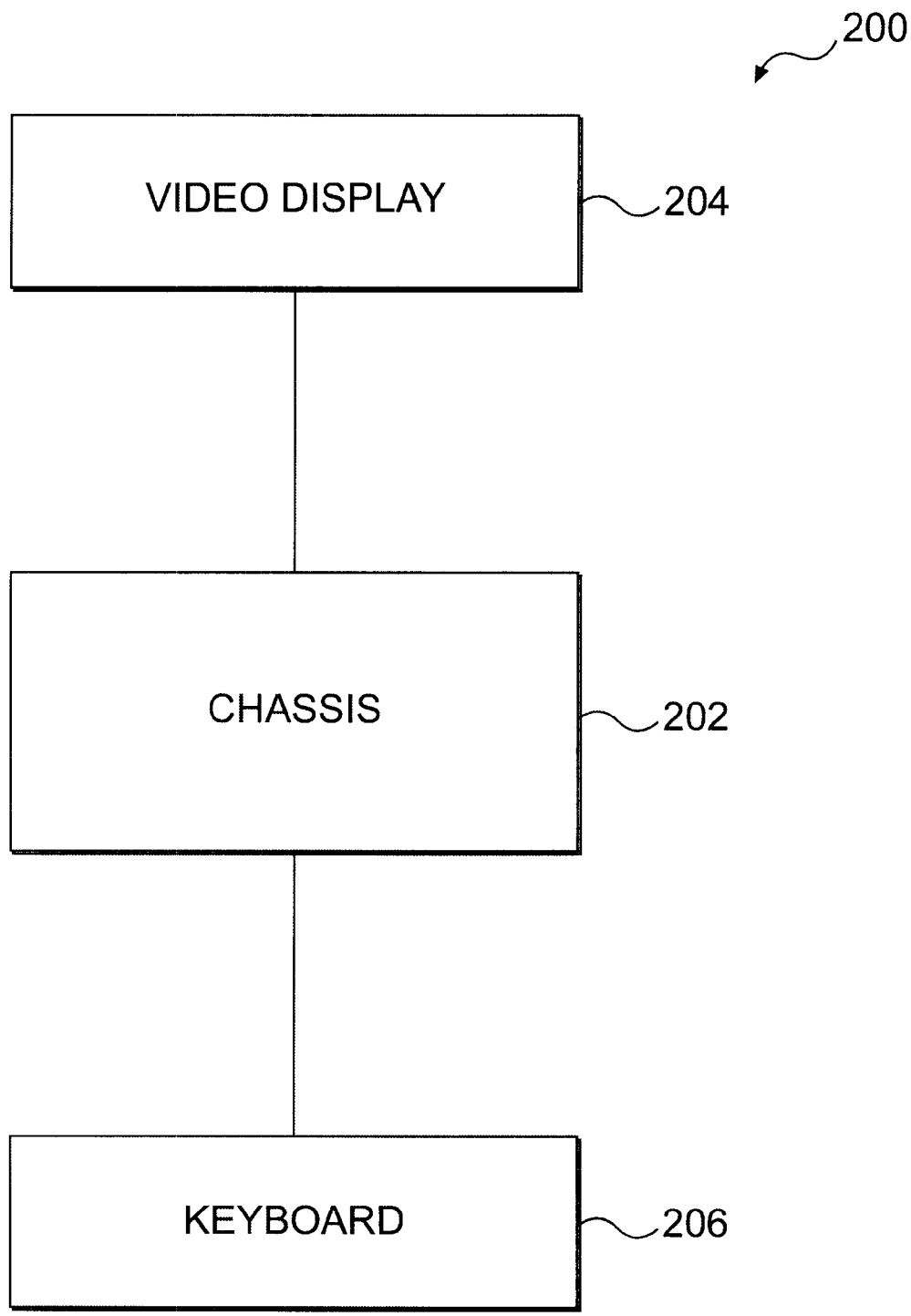
FIG. 2 depicts a data processing system suitable for use with methods and systems consistent with the present invention.

FIG. 2 depicts a data processing system 200 suitable for use with methods and systems consistent with the present invention. Data processing system 200 contains a chassis 202 connected to a video display 204 and a keyboard 206. Data processing system 200 is suitable for use as one or more nodes in the network topologies described below.

Figure 3:
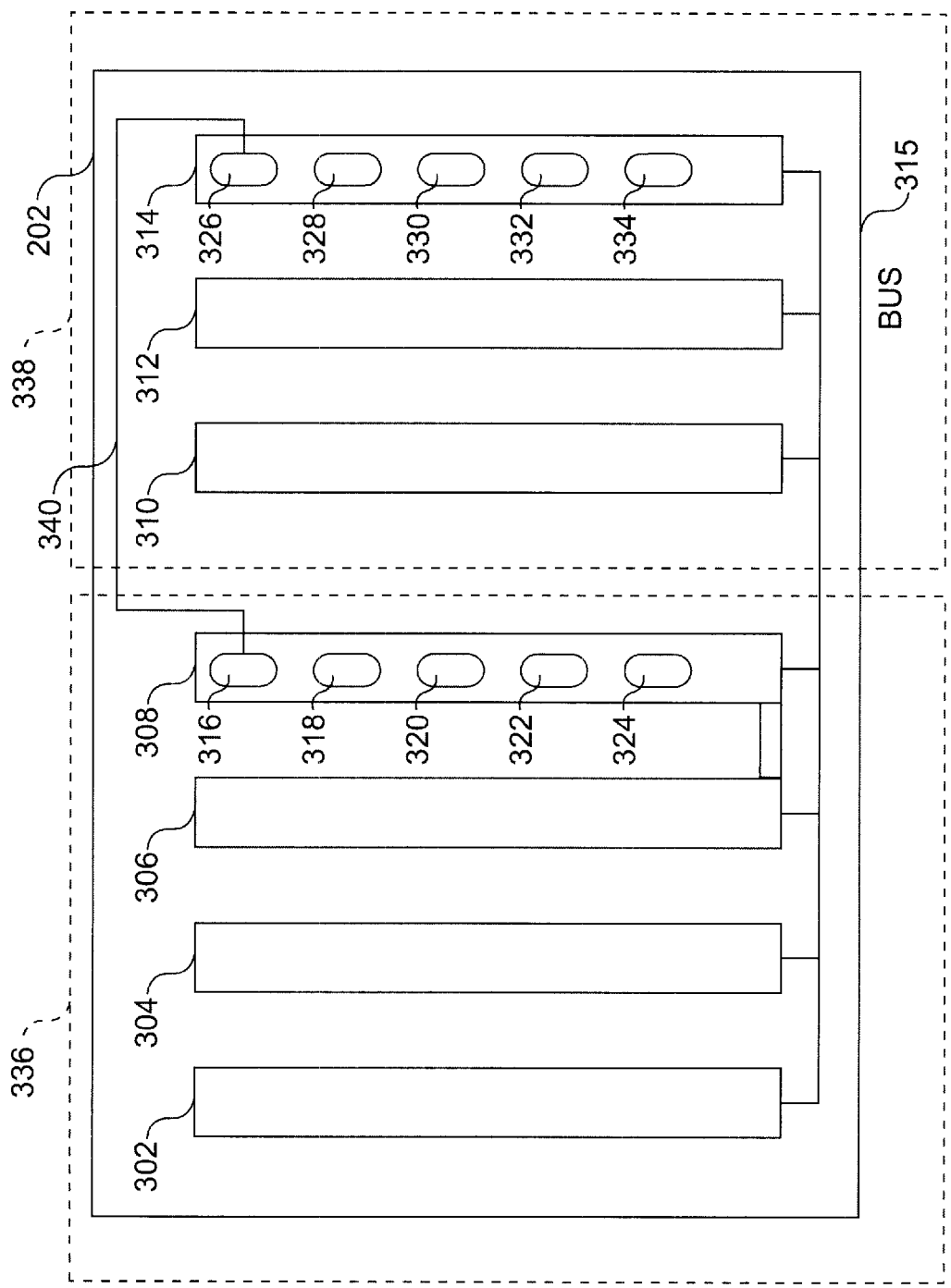
FIG. 3 depicts a more detailed diagram of the chassis of FIG. 2.

As shown in FIG. 3, chassis 202 contains up to seven cards 302–314 interconnected via bus 315. Of these cards, cards 308 and 314, known as routing cards, perform routing functionality with each having five ports 316–324 and 326–334 that connect to a communication link (e.g., a cable).

The cards other than the routing cards (i.e., cards 302–306, 310, and 312) typically contain multiple CPUs, memory, and secondary storage. In accordance with methods and systems consistent with the present invention, cards 302–308 form a single node 336. Likewise, cards 310–314 form a single node 338. Nodes 336 and 338 are referred to as partner nodes because they are both located in the same chassis 202. Since node 336 and node 338 are separate communications nodes, they may be interconnected via a communications link 340, known as a partner link. A partner link is used to transfer control information between two partner nodes: the actual data is transferred via the bus 315 for faster communications. One skilled in the art will appreciate that data processing system 200 and chassis 202 may include additional or different components, including additional nodes.

Figure 4:
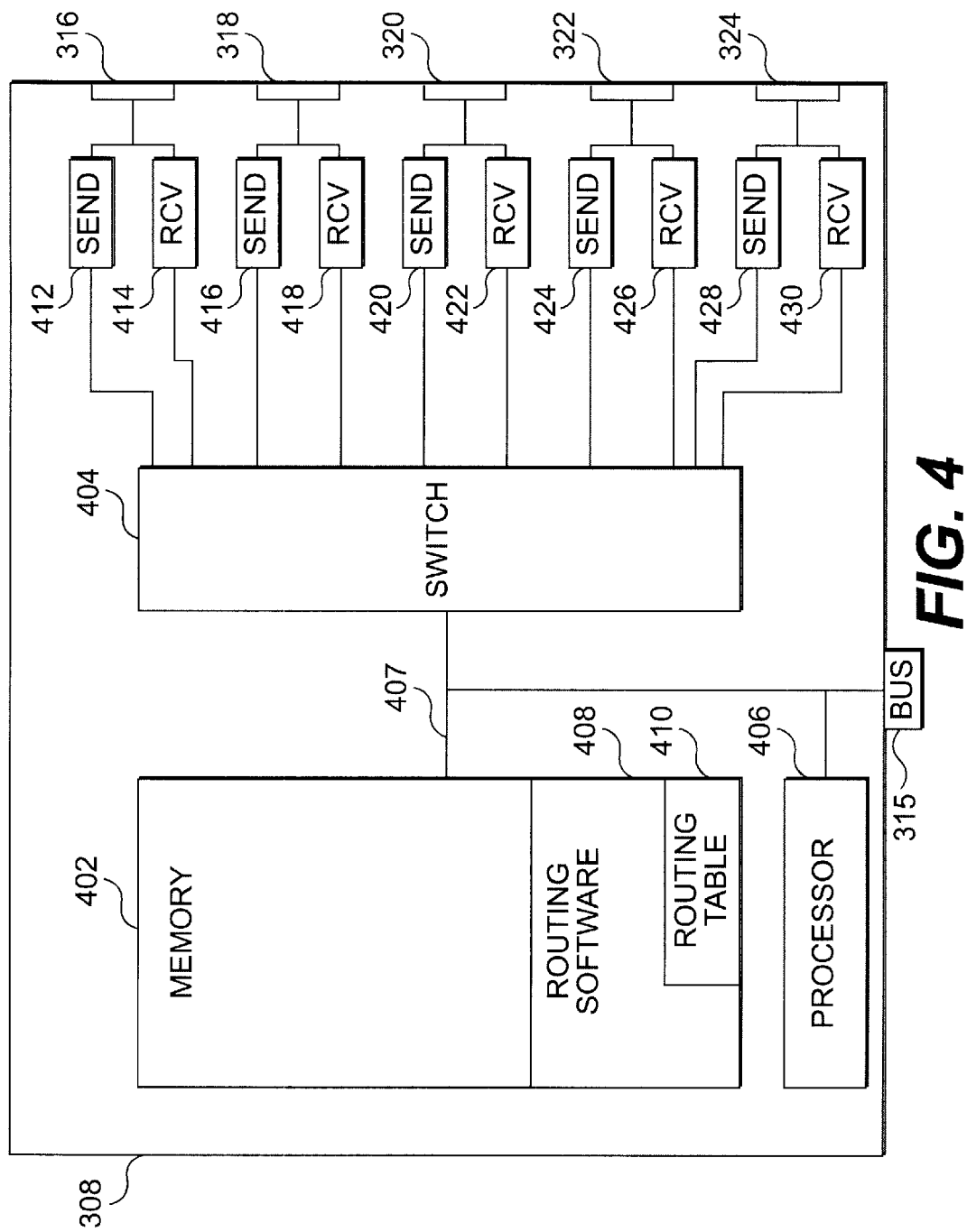
FIG. 4 depicts a more detailed diagram of a routing card depicted in FIG. 3.

FIG. 4 depicts a more detailed diagram of routing card 308, although routing card 314 is similarly configured. Routing card 308 contains a memory 402, a switch 404, and a processor 406 interconnected by an internal bus 407, which also connects to bus 315. Memory 402 contains routing software 408 that routes traffic through the network using routing table 410. Routing table 410 may contain part or all of the information contained in the routing tables provided below. The switch coordinates the sending and receiving of information across the network via ports 316–324 by using a send and receive buffer 412–430 for each port.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Sun, Sun Microsystems, the Sun logo, Java™, and Java™-based trademarks are trademarks or registered trademarks of Sun Microsystems, Inc. in the United States and other countries.

NETWORK TOPOLOGIES

In accordance with methods and systems consistent with the present invention, a number of network topologies are provided where the topologies have been selected based on both performance characteristics and the ease with which the network can be reconfigured. Network topologies for networks having seven to sixteen nodes are presented below with exemplary deadlock-free routings. The topologies for networks having less than seven nodes are not presented because they are fully connected. That is, since each routing card has five ports, in networks of six or less nodes, each node can be connected to each other node. In such a situation, the network is referred to as being fully connected.

Figure 5:
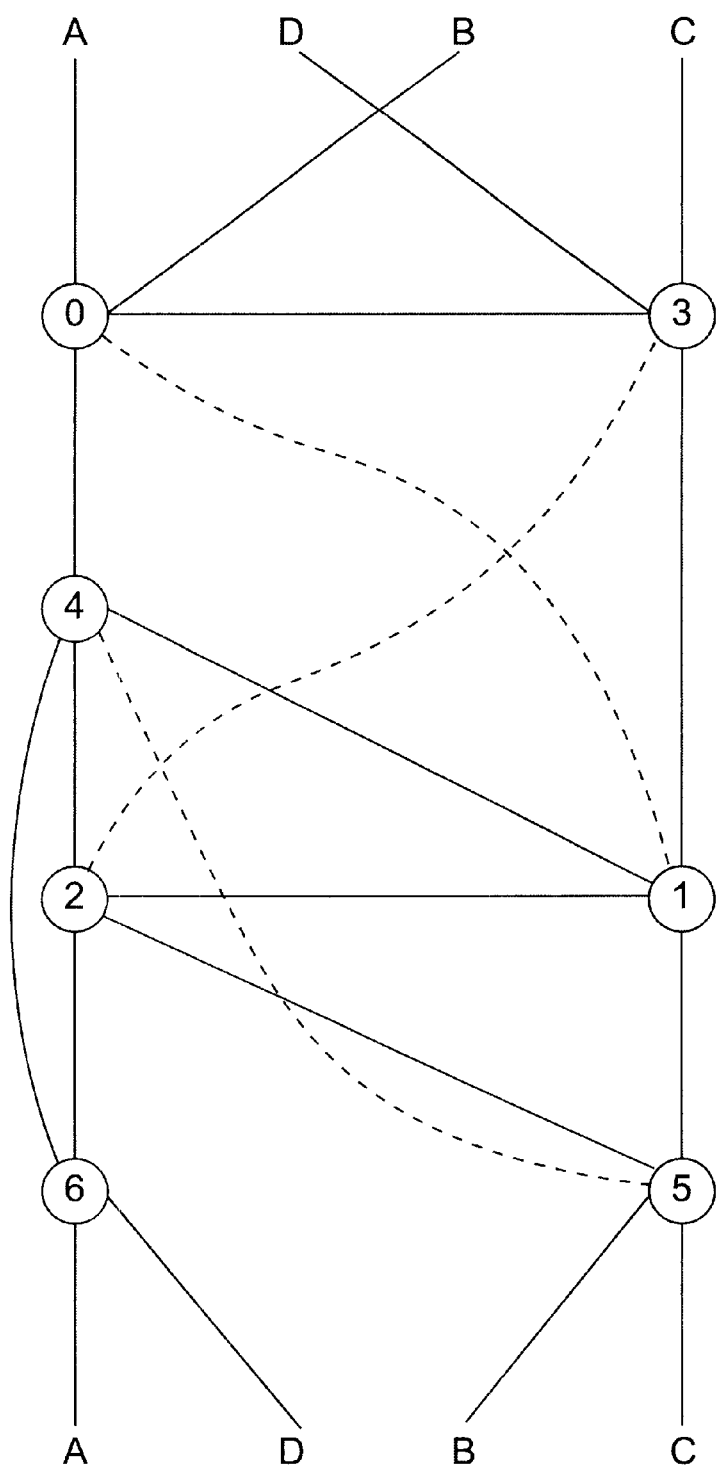
FIG. 5 depicts a network topology for a network of 7 nodes in accordance with methods and systems consistent with the present invention.

FIG. 5 depicts a network topology for a network of seven nodes in accordance with methods and systems consistent with the present invention. Each node, node 0 through node 6, has up to five links to other nodes. Each link is depicted as either a solid line or a dashed line. A solid line indicates that the link is a nonpartner link; a dashed line indicates that the link is a partner link between partner nodes. Accordingly, the two partner nodes are contained in the same device. In FIG. 5, the letters (e.g., "A") indicate a continuing connection to another like-lettered node. For example, node 0 is connected to node 6.

As shown in FIG. 5, node 0 has a partner link with node 1 and directly connects to nodes 3, 4, 5, and 6. Node 1 has a partner link with node 0 and directly connects to nodes 2, 3, 4, and 5. Node 2 has a partner link with node 3 and directly connects to nodes 1, 4, 5, and 6. Node 3 has a partner link with node 2 and directly connects to nodes 0, 1, 5, and 6. Node 4 has a partner link with node 5 and directly connects to nodes 0, 1, 2, and 6. Node 5 has a partner link with node 4 and directly connects to nodes 0, 1, 2, and 3, and node 6 directly connects to nodes 0, 2, 3, and 4. Below is a deadlock-free routing table for this network. The first row of this table, for example, shows that data from node 0 may be sent directly to nodes 1, 3, 4, 5, and 6 and that data from node 0 may be sent to node 2 via node 3.

| | TO | | | | | | |
|---|---|---|---|---|---|---|---|
| FROM | 0 | 1 | 2 | 3 | 4 | 5 | 6 |
| 0 | | — | 3 | — | — | — | — |
| 1 | — | | — | — | — | — | 4 |
| 2 | 1 | — | | — | — | — | — |
| 3 | — | — | — | | 5 | — | — |
| 4 | — | — | — | 2 | | — | — |
| 5 | — | — | — | — | — | | 3 |
| 6 | — | 0 | — | — | — | 4 | |

Figure 6:
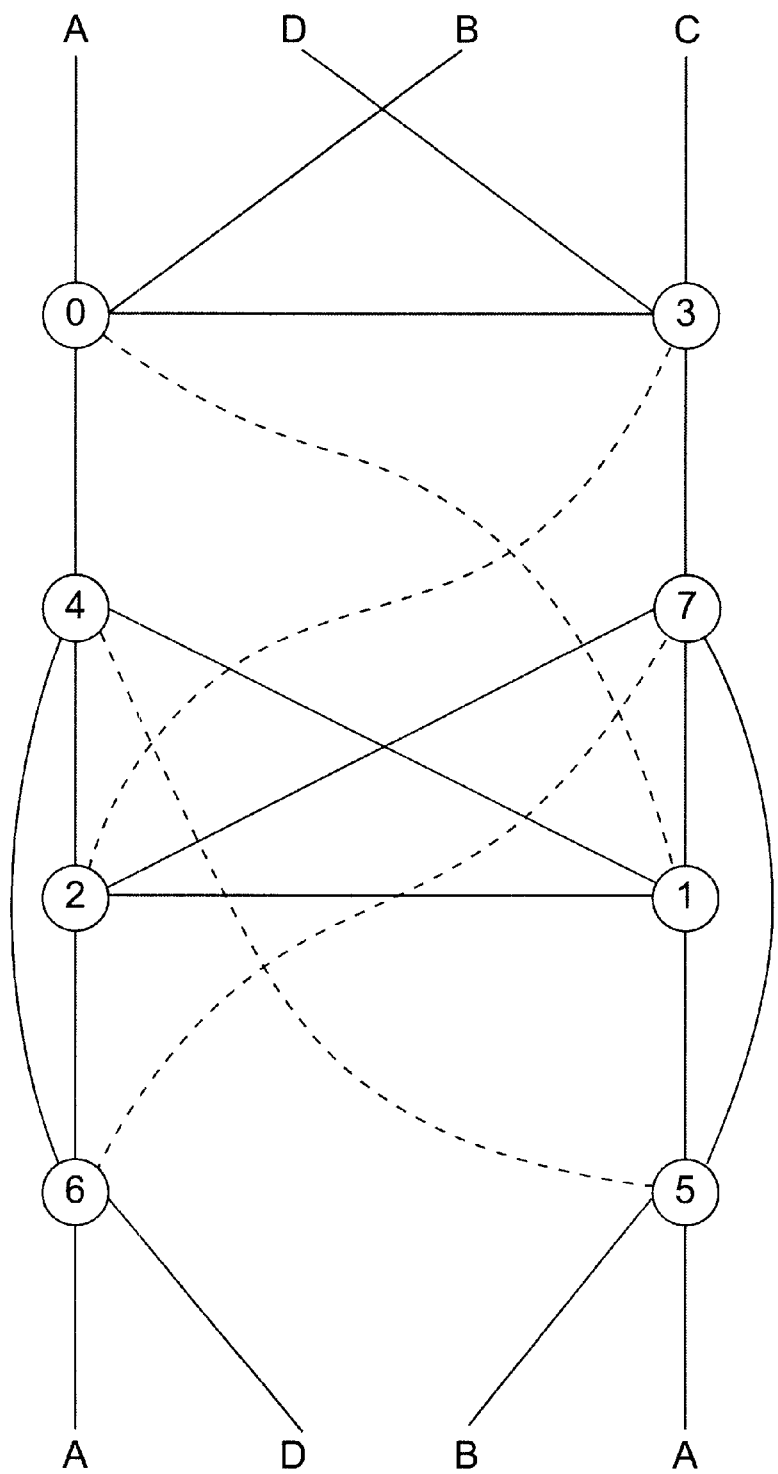
FIG. 6 depicts a network topology for a network of 8 nodes in accordance with methods and systems consistent with the present invention.

FIG. 6 depicts a network topology for a network of 8 nodes in accordance with methods and systems consistent with the present invention. As shown in FIG. 6, node 0 has a partner link with node 1 and directly connects to nodes 3 through 6. Node 1 has a partner link with node 0 and directly connects to nodes 2,4, 5, and 7. Node 2 has a partner link with node 3 and directly connects to nodes 1, 4, 6, and 7. Node 3 has a partner link with node 2 and directly connects to node 0 and nodes 5 through 7. Node 4 has a partner link with node 5 and directly connects to nodes 0–2 and 6. Node 5 has a partner link with node 4 and directly connects to nodes 0, 1, 3, and 7. Node 6 has a partner link with node 7 and directly connects to nodes 0 and 2–4, and node 7 has a partner link with node 6 and directly connects to nodes 1–3 and 5. Below is a deadlock-free routing table for this network.

| | TO | | | | | | | |
|---|---|---|---|---|---|---|---|---|
| FROM | 0 | 1 | 2 | 3 | 4 | 5 | 6 | 7 |
| 0 | | — | 3 | — | — | — | — | 6 |
| 1 | — | | — | 2 | — | — | 7 | — |
| 2 | 1 | — | | — | — | 4 | — | — |
| 3 | — | 0 | — | | 5 | — | — | — |
| 4 | — | — | — | 2 | | — | — | 6 |
| 5 | — | — | 3 | — | — | | 7 | — |
| 6 | — | 0 | — | — | — | 4 | | — |
| 7 | 1 | — | — | — | 5 | — | — | |

Figure 7:
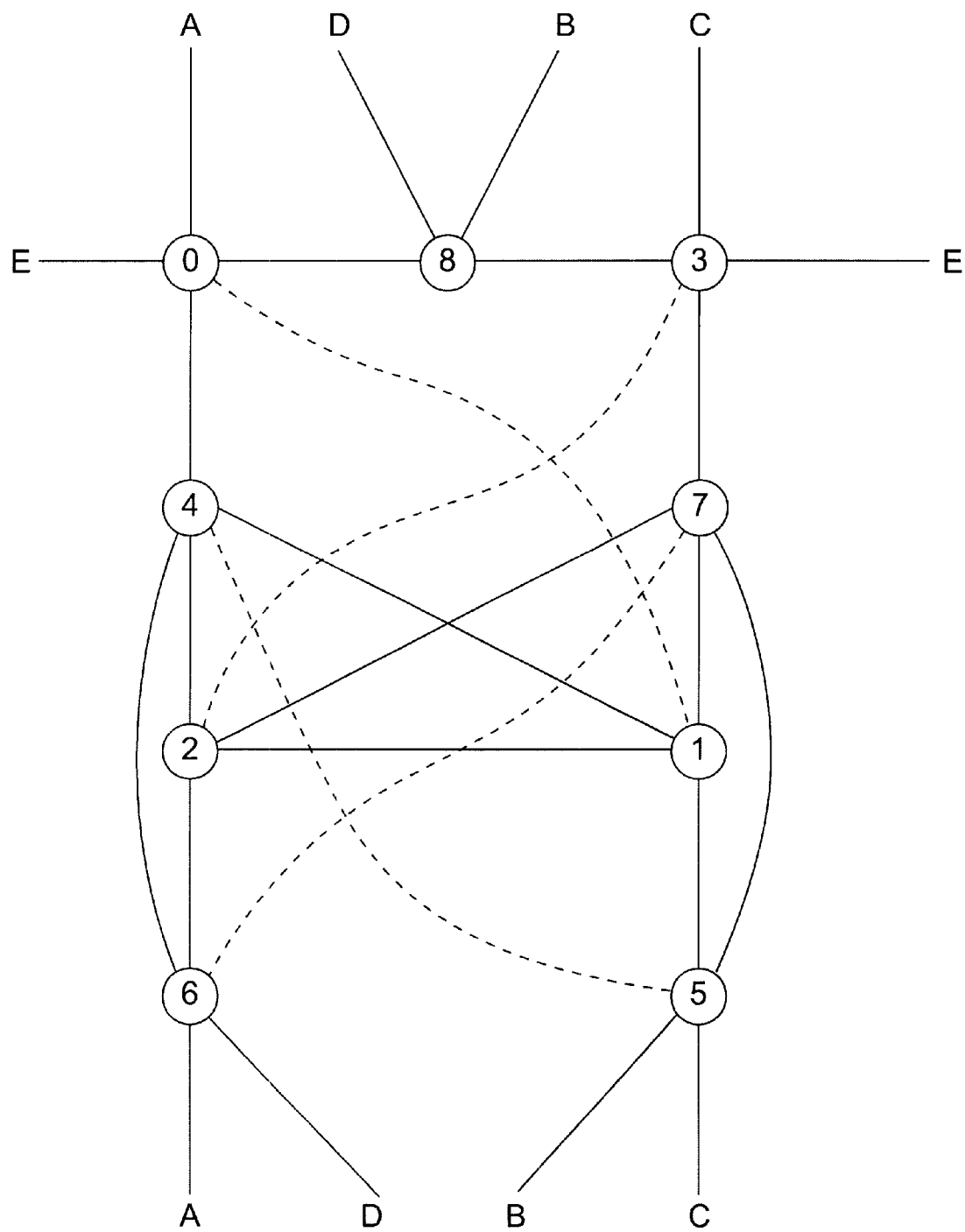
FIG. 7 depicts a network topology for a network of 9 nodes in accordance with methods and systems consistent with the present invention.

FIG. 7 depicts a network topology for a network of 9 nodes in accordance with methods and systems consistent with the present invention. As shown in FIG. 7, node 0 has a partner link with node 1 and directly connects to nodes 3, 4, 6, and 8. Node 1 has a partner link with node 0 and directly connects to nodes 2, 4, 5, and 7. Node 2 has a partner link with node 3 and directly connects to nodes 1, 4, 6, and 7. Node 3 has a partner link with node 2 and directly connects to nodes 0, 5, 7, and 8. Node 4 has a partner link with node 5 and directly connects to nodes 0–2 and 6. Node 5 has a partner link with node 4 and directly connects to nodes 1, 3, 7, and 8. Node 6 has a partner link with node 7 and directly connects to nodes 0, 2, 4, and 8. Node 7 has a partner link with node 6 and directly connects to nodes 1–3 and 5, and node 8 directly connects to nodes 0, 3, 5, and 6. Below a deadlock-free routing table for this network.

|      |   |   |   | TO |   |   |   |   |   |
|------|---|---|---|----|---|---|---|---|---|
| FROM | 0 | 1 | 2 | 3  | 4 | 5 | 6 | 7 | 8 |
| 0    | — | — | 3 | —  | — | 4 | — | 6 | — |
| 1    | — | — | — | 2  | — | — | 7 | — | 5 |
| 2    | 1 | — | — | —  | — | 4 | — | — | 6 |
| 3    | — | 0 | — | —  | 5 | — | 7 | — | — |
| 4    | — | — | — | 2  | — | — | — | 6 | 0 |
| 5    | 1 | — | 3 | —  | — | — | 7 | — | — |
| 6    | — | 0 | — | 2  | — | 4 | — | — | — |
| 7    | 1 | — | — | —  | 5 | — | — | — | 3 |
| 8    | — | 0 | 3 | —  | 5 | — | — | 6 | — |

Figure 8:
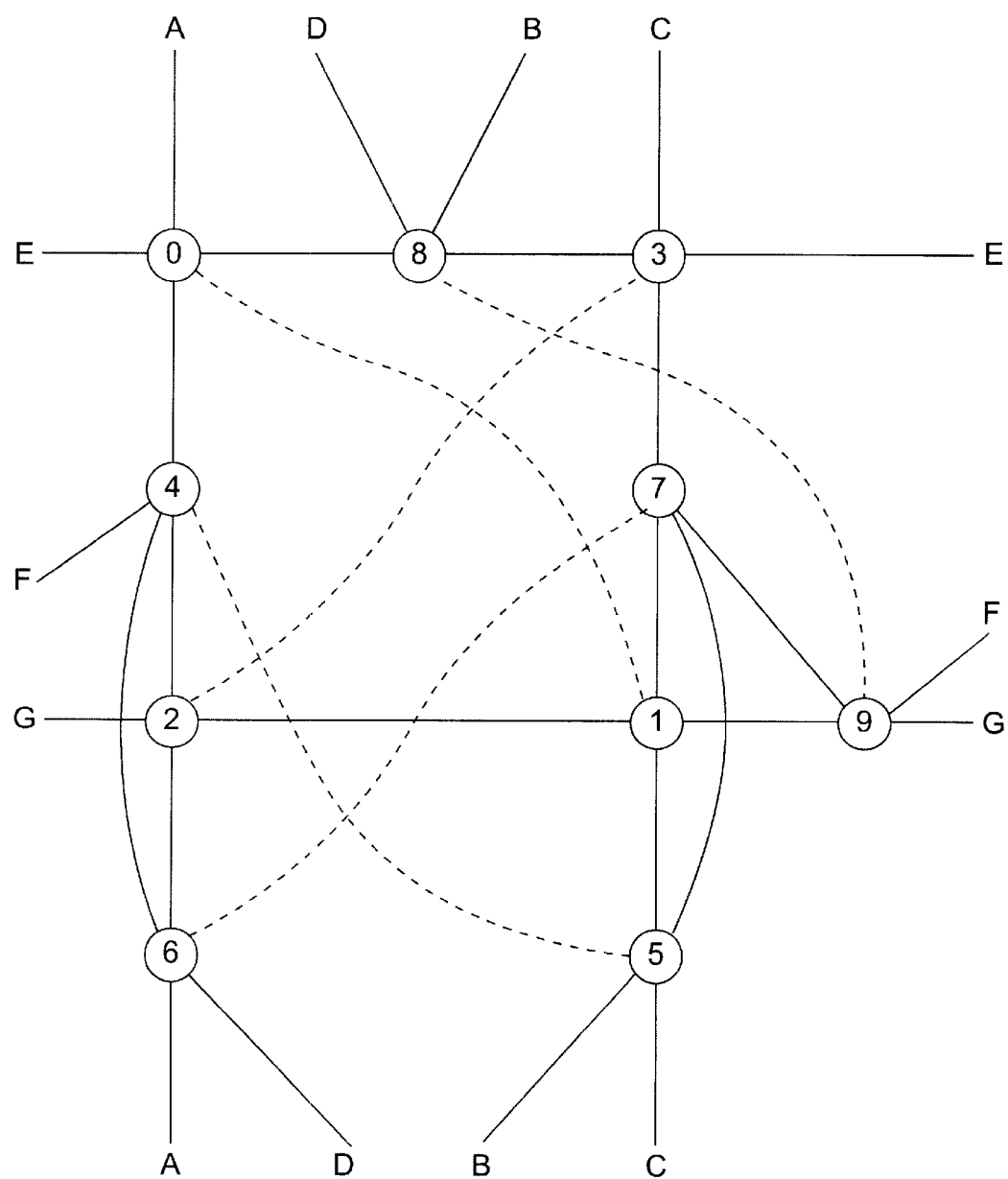
FIG. 8 depicts a network topology for a network of 10 nodes in accordance with methods and systems consistent with the present invention.

FIG. 8 depicts a network topology for a network of 10 nodes in accordance with methods and systems consistent with the present invention. As shown in FIG. 8, node 0 has a partner link with node 1 and directly connects to nodes 3, 4, 6, and 8. Node 1 has a partner link with node 0 and directly connects to nodes 2, 5, 7, and 9. Node 2 has a partner link with node 3 and directly connects to nodes 1, 4, 6, and 9. Node 3 has a partner link with node 2 and directly connects to nodes 0, 5, 7, and 8. Node 4 has a partner link with node 5 and directly connects to nodes 0, 2, 6, and 9. Node 5 has a partner link with node 4 and directly connects to nodes 1, 3, 7, and 8. Node 6 has a partner link with node 7 and directly connects to nodes 0, 2, 4, and 8. Node 7 has a partner link with node 6 and directly connects to nodes 1, 3, 5, and 9. Node 8 has a partner link with node 9 and directly connects to nodes 0, 3, 5, and 6, and n ode 9 has a partner link with node 8 and directly connects to nodes 1, 2, 4, and 7. Below is a deadlock-free routing table for this network.

|      |   |   |   |   | TO |   |   |   |   |   |
|------|---|---|---|---|----|---|---|---|---|---|
| FROM | 0 | 1 | 2 | 3 | 4  | 5 | 6 | 7 | 8 | 9 |
| 0    | — | — | 3 | — | —  | 4 | — | 6 | — | 8 |
| 1    | — | — | — | 2 | 5  | — | 7 | — | 9 | — |
| 2    | 1 | — | — | — | —  | 4 | — | 6 | 9 | — |
| 3    | — | 0 | — | — | 5  | — | 7 | — | — | 8 |
| 4    | — | 0 | — | 2 | —  | — | — | 6 | 9 | — |
| 5    | 1 | — | 3 | — | —  | — | — | 7 | — | 8 |
| 6    | — | 0 | — | 2 | —  | 4 | — | — | — | 8 |
| 7    | 1 | — | 3 | — | 5  | — | — | — | 9 | — |
| 8    | — | 0 | 3 | — | 5  | — | — | 6 | — | — |
| 9    | 1 | — | — | 2 | —  | 4 | 7 | — | — | — |

Figure 9:
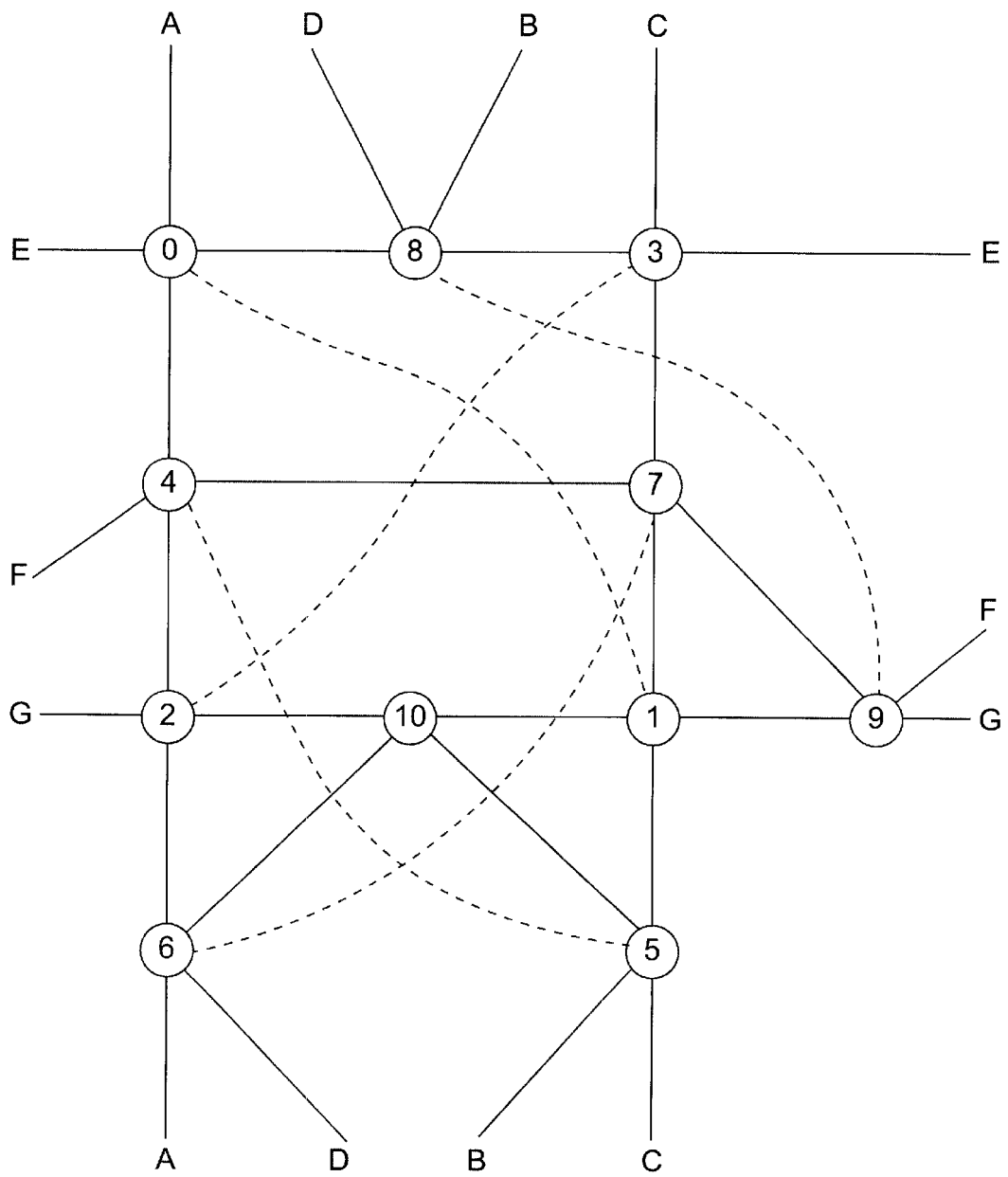
FIG. 9 depicts a network topology for a network of 11 nodes in accordance with methods and systems consistent with the present invention.

FIG. 9 depicts a network topology for a network of 11 nodes in accordance with methods and systems consistent with the present invention. As shown in FIG. 9, node 0 has a partner link with node 1 and directly connects to nodes 3, 4, 6, and 8. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 0, 5, 7, and 8. Node 4 has a partner link with node 5 and directly connects to nodes 0, 2, 7, and 9. Node 5 has a partner link with node 4 and directly connects to nodes 1, 3, 8, and 10. Node 6 has a partner link with node 7 and directly connects to nodes 0, 2, 8, and 10. Node 7 has a partner link with node 6 and directly connects to nodes 1, 3, 4, and 9. Node 8 has a partner link with node 9 and directly connects to nodes 0, 3, 5, and 6. Node 9 has a partner link with node 8 and directly connects to nodes 1, 2, 4, and 7, and node 10 directly connects to nodes 1, 2, 5, and 6. A deadlock-free routing table for this network is provided below.

|      |   |    |   |   | TO |   |   |   |   |   |    |
|------|---|----|---|---|----|---|---|---|---|---|----|
| FROM | 0 | 1  | 2 | 3 | 4  | 5 | 6 | 7 | 8 | 9 | 10 |
| 0    | — | —  | 3 | — | —  | 4 | — | 6 | — | 8 | 6  |
| 1    | — | —  | 9 | 5 | 5  | — | 7 | — | 9 | — | —  |
| 2    | 6 | 10 | — | — | 4  | — | 6 | 9 | — | — | —  |
| 3    | — | 0  | — | — | 5  | — | 7 | — | — | 8 | 5  |
| 4    | — | 0  | — | 2 | —  | — | 7 | — | 9 | — | 2  |
| 5    | 1 | —  | 3 | — | —  | — | 8 | 1 | — | 8 | —  |
| 6    | — | 0  | — | 2 | 2  | 8 | — | — | — | 8 | —  |
| 7    | 1 | —  | — | 3 | —  | — | 4 | — | 9 | — | 1  |
| 8    | — | 0  | 3 | — | 5  | — | — | 6 | — | — | 6  |
| 9    | 1 | —  | — | 2 | —  | 4 | 7 | — | — | — | 1  |
| 10   | 1 | —  | — | 2 | 5  | — | — | 6 | 6 | 2 | —  |

Figure 10:
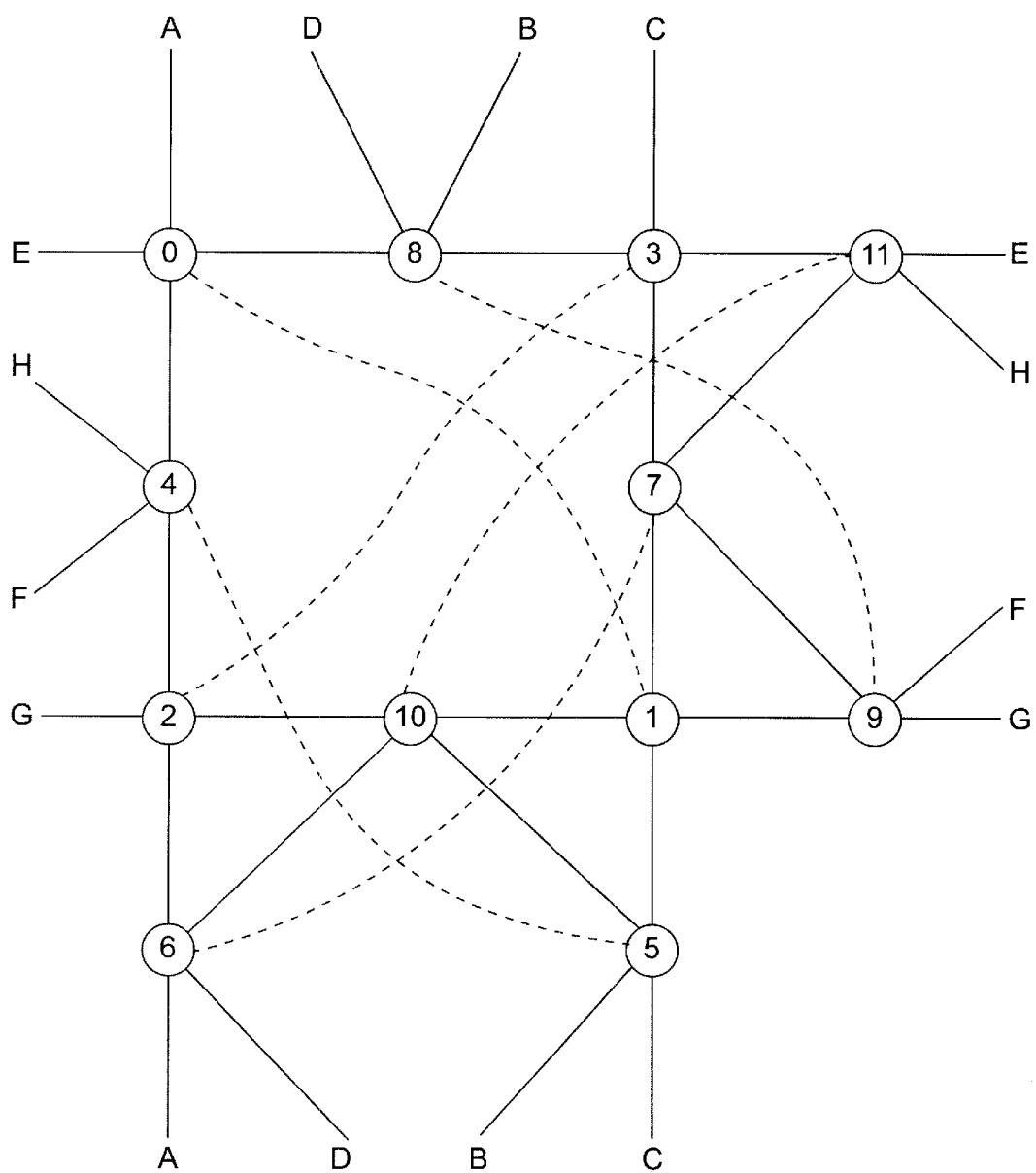
FIG. 10 depicts a network topology for a network of 12 nodes in accordance with methods and systems consistent with the present invention.

FIG. 10 depicts a network topology for a network of 12 nodes in accordance with methods and systems consistent with the present invention. As shown in FIG. 10, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 11. Node 5 has a partner link with node 4 and directly connects to nodes 1, 3, 8, and 10. Node 6 has a partner link with node 7 and directly connects to nodes 0, 2, 8, and 10. Node 7 has a partner link with node 6 and directly connects to nodes 1, 3, 9, and 11. Node 8 has a partner link with node 9 and directly connects to nodes 0, 3, 5, and 6. Node 9 has a partner link with node 8 and directly connects to nodes 1, 2, 4, and 7. Node 10 has a partner link with node 11 and directly connects to nodes 1, 2, 5, and 6, and node 11 has a partner link with node 10 and directly connects to nodes 0, 3, 4, and 7. A deadlock-free routing table is provided below.

|      |    |    |   |   |   | TO |   |   |   |   |    |    |
|------|----|----|---|---|---|----|---|---|---|---|----|----|
| FROM | 0  | 1  | 2 | 3 | 4 | 5  | 6 | 7 | 8 | 9 | 10 | 11 |
| 0    | —  | —  | 4 | 8 | — | 4  | — | 6 | — | 8 | 11 | —  |
| 1    | —  | —  | 9 | 5 | 5 | —  | 7 | — | 9 | — | —  | 10 |
| 2    | 6  | 10 | — | — | 4 | —  | 6 | 9 | — | — | —  | 10 |
| 3    | 11 | 7  | — | — | 5 | —  | 7 | — | — | 8 | 11 | —  |
| 4    | —  | 0  | — | 2 | — | —  | 0 | 9 | 9 | — | 11 | —  |
| 5    | 1  | —  | 3 | — | — | —  | 10 | 1 | — | 8 | —  | 10 |
| 6    | —  | 0  | — | 2 | 2 | 10 | — | — | 8 | — | —  | 10 |
| 7    | 1  | —  | 3 | — | 9 | 3  | — | — | 9 | — | 11 | 5  |
| 8    | —  | 0  | 3 | — | 5 | —  | — | 6 | — | — | 5  | 0  |
| 9    | 1  | —  | — | 2 | — | 4  | 7 | — | — | — | 1  | 7  |
| 10   | 1  | —  | — | 2 | 5 | —  | — | 6 | 5 | 2 | —  | —  |
| 11   | —  | 0  | 3 | — | — | —  | 4 | 7 | — | 3 | 7  | —  |

Figure 11:
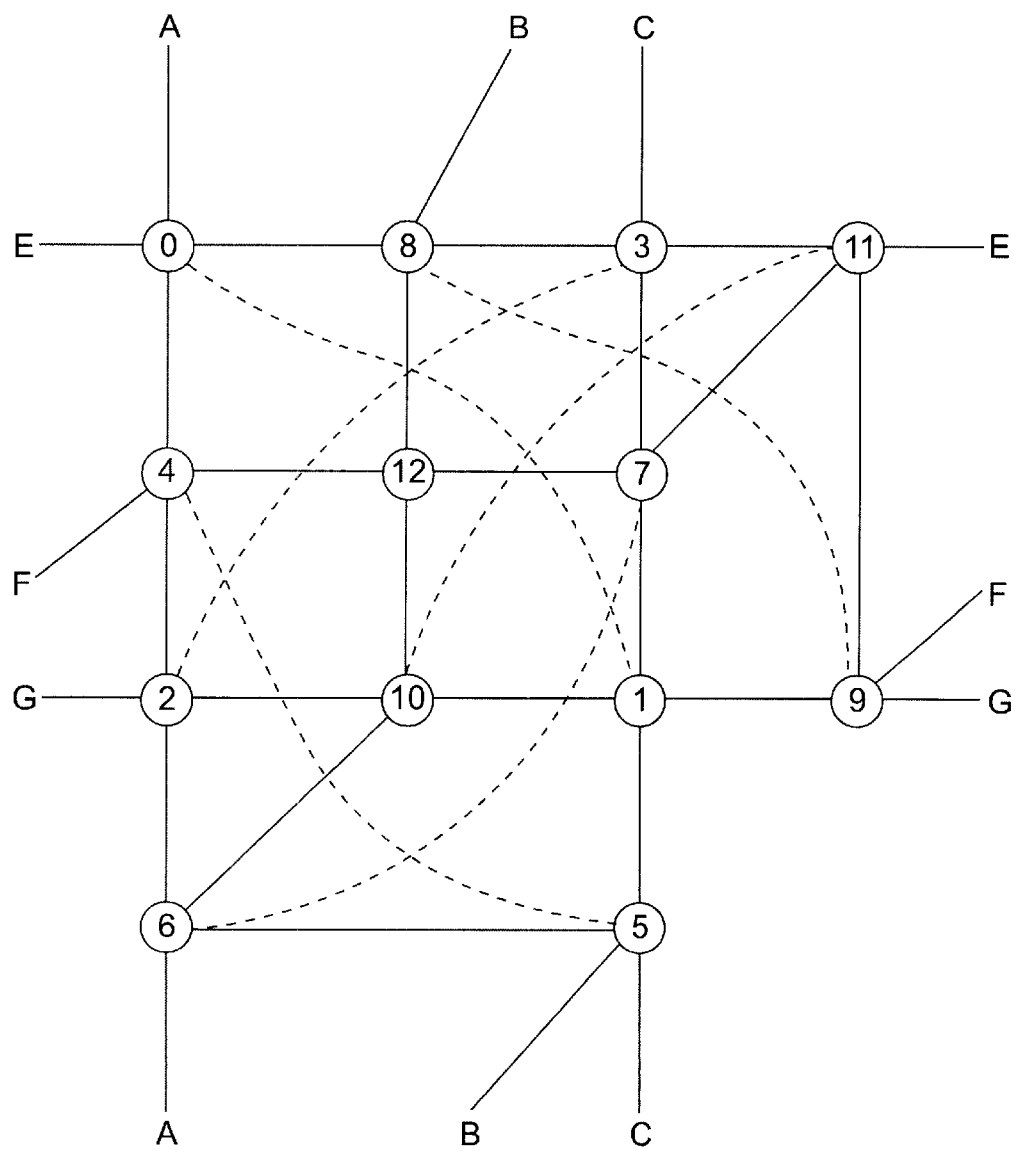
FIG. 11 depicts a network topology for a network of 13 nodes in accordance with methods and systems consistent with the present invention.

FIG. 11 depicts a network topology for a network of 13 nodes in accordance with methods and systems consistent with the present invention. As shown in FIG. 11, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with node 4 and directly connects to nodes 1, 3, 6, and 8. Node 6 has a partner link with node 7 and directly connects to nodes 0, 2, 5, and 10. Node 7 has a partner link with node 6 and directly connects to nodes 1, 3, 11, and 12. Node 8 has a partner link with node 9 and directly connects to nodes 0, 3, 5, and 12. Node 9 has a partner link with node 8 and directly connects to nodes 1, 2, 4, and 11. Node 10 has a partner link with node 11 and directly connects to nodes 1, 2, 6, and 12. Node 11 has a partner link with node 10 and directly connects to nodes 0, 3, 7, and 9, and node 12 directly connects to nodes 4, 7, 8, and 10. A deadlock-free routing table for this network is provided below.

|      |   |   |   |   |   |   | TO |   |   |   |    |    |    |
|------|---|---|---|---|---|---|----|---|---|---|----|----|----|
| FROM | 0 | 1 | 2 | 3 | 4 | 5 | 6  | 7 | 8 | 9 | 10 | 11 | 12 |
| 0    | — | — | 4 | 8 | — | 4 | —  | 6 | — | 8 | 11 | —  | 4  |
| 1    | — | — | 9 | 5 | 5 | — | 7  | — | 9 | — | —  | 10 | 7  |
| 2    | 6 | 10| — | — | 4 | — | 6  | 9 | — | — | 10 | 10 |    |
| 3    | 11| 7 | — | — | 5 | — | 7  | — | — | 8 | 11 | —  | 7  |
| 4    | — | 0 | — | 2 | — | — | 0  | 12| 9 | — | 12 | 0  | —  |
| 5    | 1 | — | 3 | — | — | — | 6  | — | 8 | 1 | 3  | 8  |    |
| 6    | — | 0 | — | 2 | 5 | — | —  | 0 | 2 | — | 10 | 10 |    |
| 7    | 1 | — | 3 | — | 12| 3 | —  | 3 | 11| 11| —  | —  |    |
| 8    | — | 0 | 3 | — | 5 | — | 0  | 12| — | 12| 0  | —  |    |
| 9    | 1 | — | — | 2 | — | 4 | 2  | 1 | — | 11| —  | 4  |    |
| 10   | 1 | — | — | 2 | 2 | 6 | —  | 6 | 12| 2 | —  | —  |    |
| 11   | — | 0 | 3 | — | 0 | 3 | 7  | — | 9 | — | —  | 7  |    |
| 12   | 8 | 10| 4 | 8 | — | 4 | 7  | — | — | 8 | —  | 10 |    |

Figure 12:
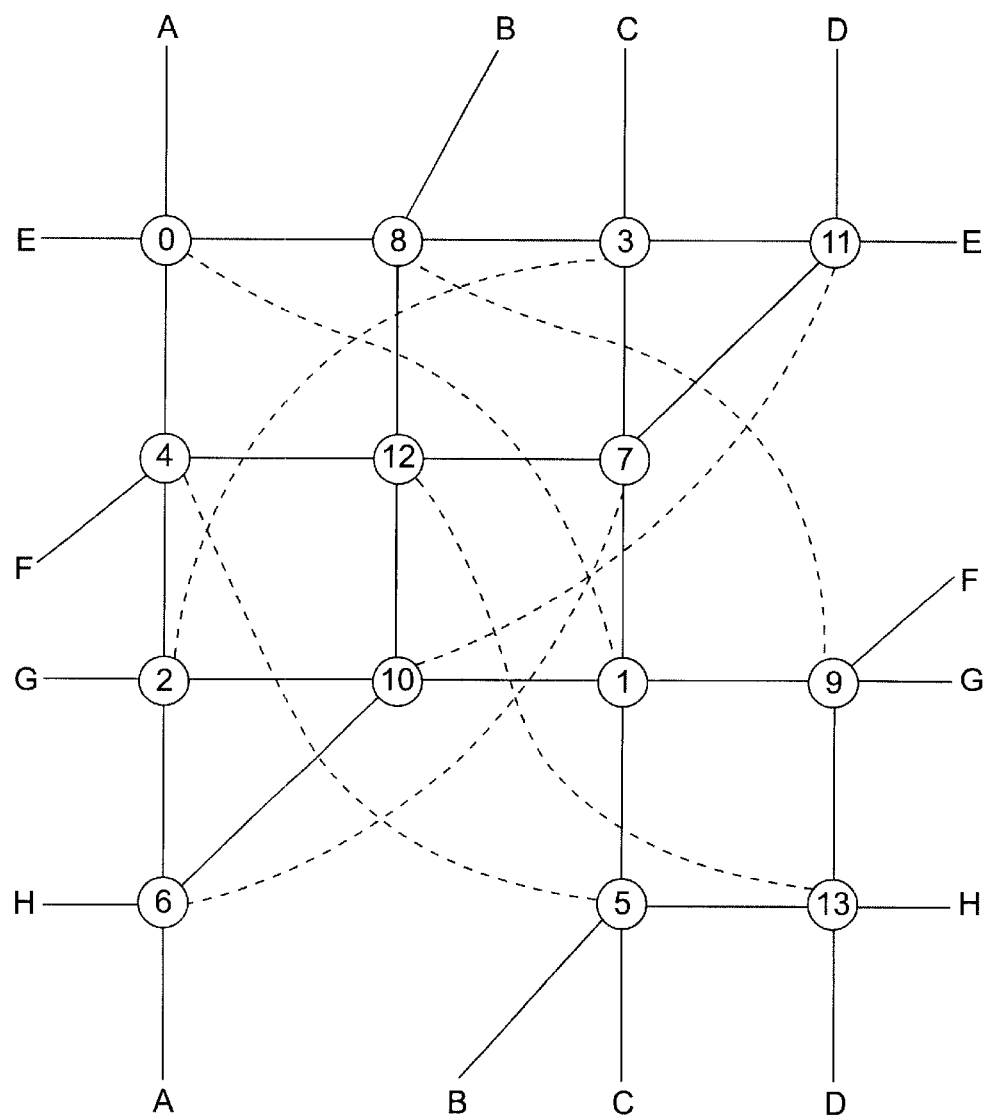
FIG. 12 depicts a network topology for a network of 14 nodes in accordance with methods and systems consistent with the present invention.

FIG. 12 depicts a network topology for a network of 14 nodes in accordance with methods and systems consistent with the present invention. As shown in FIG. 12, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with node 4 and directly connects to nodes 1, 3, 8, and 13. Node 6 has a partner link with node 7 and directly connects to nodes 0, 2, 10, and 13. Node 7 has a partner link with node 6 and directly connects to nodes 1, 3, 11, and 12. Node 8 has a partner link with node 9 and directly connects to nodes 0, 3, 5, and 12. Node 9 has a partner link with node 8 and directly connects to nodes 1, 2, 4, and 13. Node 10 has a partner link with node 11 and directly connects to nodes 1, 2, 6, and 12. Node 11 has a partner link with node 10 and directly connects to nodes 0, 3, 7, and 13. Node 12 has a partner link with node 13 and directly connects to nodes 4, 7, 8, and 10, and node 13 has a partner link with node 12 and directly connects to nodes 5, 6, 9, and 11. A deadlock-free routing table for this network is provided below.

|      |   |   |   |   |   |   |   | TO |   |   |    |    |    |    |
|------|---|---|---|---|---|---|---|----|---|---|----|----|----|----|
| FROM | 0 | 1 | 2 | 3 | 4 | 5 | 6 | 7  | 8 | 9 | 10 | 11 | 12 | 13 |
| 0    | — | — | 4 | 8 | — | 4 | — | 6  | — | 8 | 11 | —  | 8  | 6  |
| 1    | — | — | 9 | 5 | 5 | — | 7 | —  | 9 | — | —  | 10 | 7  | 5  |
| 2    | 6 | 10| — | — | 4 | — | 6 | 9  | — | — | 10 | 10 | 6  |    |
| 3    | 11| 7 | — | — | 5 | — | 7 | —  | 8 | 11| —  | 7  | 11 |    |
| 4    | — | 0 | — | 2 | — | — | 0 | 12 | 9 | — | 12 | 0  | —  | 12 |
| 5    | 1 | — | 3 | — | — | — | 13| 1  | — | 8 | 1  | 13 | 13 | —  |
| 6    | — | 0 | — | 2 | 2 | 13| — | —  | 0 | 2 | —  | 10 | 13 | —  |
| 7    | 1 | — | 3 | — | 12| 3 | — | —  | 3 | 1 | 11 | —  | —  | 12 |
| 8    | — | 0 | 3 | — | 5 | — | 0 | 12 | — | — | 12 | 0  | —  | 12 |
| 9    | 1 | — | — | 2 | — | 4 | 13| 1  | — | — | 1  | 13 | 13 | —  |
| 10   | 1 | — | — | 2 | 2 | 1 | — | 6  | 12| 2 | —  | —  | —  | 12 |
| 11   | — | 0 | 3 | — | 0 | 3 | 7 | —  | 3 | 13| —  | —  | 13 | —  |
| 12   | 8 | 10| 4 | 8 | — | 4 | 7 | —  | — | 8 | —  | 10 | —  | —  |
| 13   | 11| 9 | 9 | 5 | 5 | — | — | 6  | 9 | — | 11 | —  | —  | —  |

Figure 13:
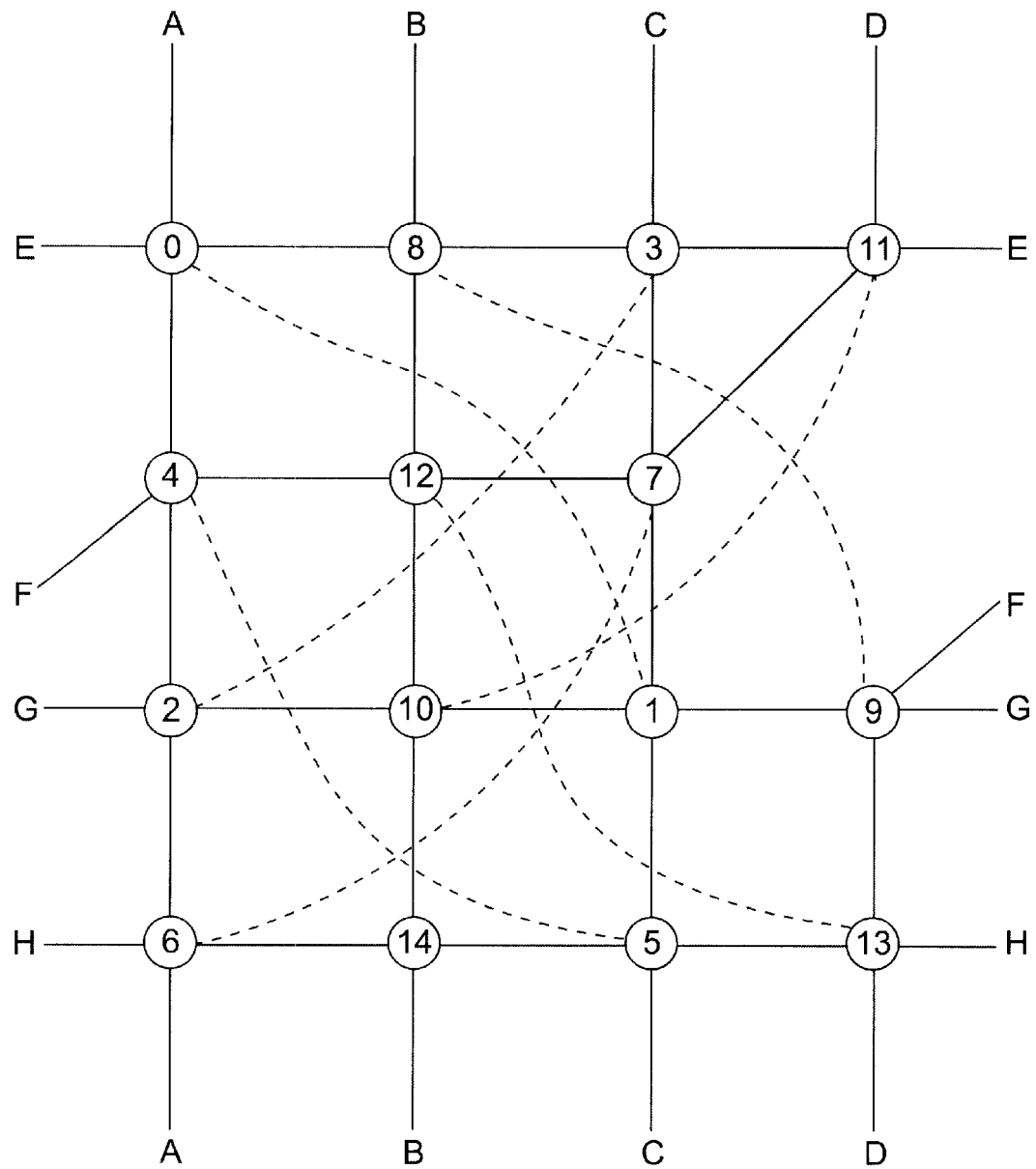
FIG. 13 depicts a network topology for a network of 15 nodes in accordance with methods and systems consistent with the present invention.

FIG. 13 depicts a network topology for a network of 15 nodes in accordance with methods and systems consistent with the present invention. As shown in FIG. 13, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with node 4 and directly connects to nodes 1, 3, 13, and 14. Node 6 has a partner link with node 7 and directly connects to nodes 0, 2, 13, and 14. Node 7 has a partner link with node 6 and directly connects to nodes 1, 3, 11, and 12. Node 8 has a partner link with node 9 and directly connects to nodes 0, 3, 12, and 14. Node 9 has a partner link with node 8 and directly connects to nodes 1, 2, 4, and 13. Node 10 has a partner link with node 11 and directly connects to nodes 1, 2, 12, and 14. Node 11 has a partner link with node 10 and directly connects to nodes 0, 3, 7, and 13. Node 12 has a partner link with node 13 and directly connects to nodes 4, 7, 8, and 10. Node 13 has a partner link with node 12 and directly connects to nodes 5,

6, 9, and 11, and node 14 directly connects to nodes 5, 6, 8, and 10. A deadlock-free routing table for this network is provided below.

|  | | | | | | | TO | | | | | | | | |
|---|---|---|---|---|---|---|---|---|---|---|---|---|---|---|---|
| FROM | 0 | 1 | 2 | 3 | 4 | 5 | 6 | 7 | 8 | 9 | 10 | 11 | 12 | 13 | 14 |
| 0 | — | — | 4 | 8 | — | 4 | — | 6 | — | 8 | 11 | — | 4 | 6 | 8 |
| 1 | — | — | 9 | 5 | 5 | — | 7 | — | 9 | — | — | 10 | 7 | 5 | 5 |
| 2 | 6 | 10 | — | — | — | 4 | — | 6 | 9 | — | — | 10 | 10 | 6 | 6 |
| 3 | 11 | 7 | — | — | 5 | — | 7 | — | — | 8 | 11 | — | 7 | 11 | 5 |
| 4 | — | 0 | — | 2 | — | — | 0 | 12 | 9 | — | 12 | 0 | — | 12 | 5 |
| 5 | 1 | — | 3 | — | — | — | 13 | 1 | 3 | 1 | 1 | 13 | 13 | — | — |
| 6 | — | 0 | — | 2 | 2 | 14 | — | — | 14 | 2 | 2 | 0 | 13 | — | — |
| 7 | 1 | — | 3 | — | 12 | 3 | — | — | 3 | 1 | 11 | — | — | 12 | 6 |
| 8 | — | 0 | 3 | — | 12 | 14 | 0 | 12 | — | — | 12 | 0 | — | 12 | — |
| 9 | 1 | — | — | 2 | — | 4 | 13 | 1 | — | — | 1 | 13 | 13 | — | 8 |
| 10 | 1 | — | — | 2 | 2 | 14 | 2 | 12 | 14 | 2 | — | — | — | 12 | — |
| 11 | — | 0 | 3 | — | 0 | 3 | 7 | — | 3 | 13 | — | — | 13 | — | 10 |
| 12 | 8 | 10 | 4 | 8 | — | 4 | 7 | — | — | 8 | — | 10 | — | — | 8 |
| 13 | 11 | 9 | 9 | 5 | 5 | — | — | 6 | 9 | — | 11 | — | — | — | 5 |
| 14 | 6 | 10 | 10 | 8 | 5 | — | — | 6 | — | 8 | — | 10 | 10 | 6 | — |

Figure 14:
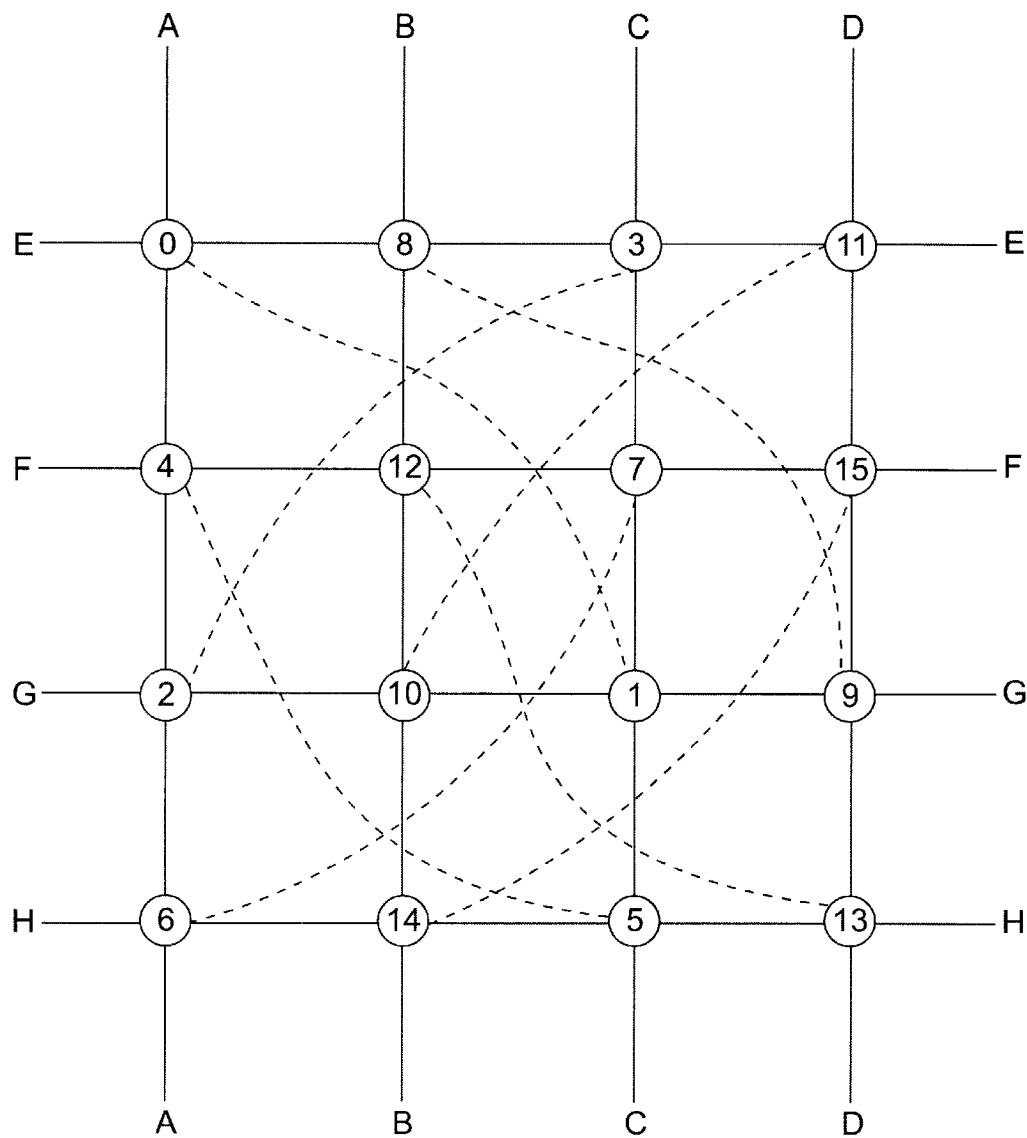
FIG. 14 depicts a network topology for a network of 16 nodes in accordance with methods and systems consistent with the present invention.

FIG. 14 depicts a network topology for a network of 16 nodes in accordance with methods and systems consistent with the present invention. As shown in this figure, node 0 has a partner link with node and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 12, and 15. Node 5 has a partner link with node 4 and directly connects to nodes 1, 3, 13, and 14. Node 6 has a partner link with node 7 and directly connects to nodes 0, 2, 13, and 14. Node 7 has a partner link with node 6 and directly connects to nodes 1, 3, 12, and 15. Node 8 has a partner link with node 9 and directly connects to nodes 0, 3, 12, and 14. Node 9 has a partner link with node 8 and directly connects to nodes 1, 2, 13, and 15. Node 10 has a partner link with node 11 and directly connects to nodes 1, 2, 12, and 14. Node 11 has a partner link with node 10 and directly connects to nodes 0, 3, 13, and 15. Node 12 has a partner link with node 13 and directly connects to nodes 4, 7, 8, and 10. Node 13 has a partner link with node 12 and directly connects to nodes 5, 6, 9, and 11. Node 14 has a partner link with node 15 and directly connects to nodes 5, 6, 8, and 10, and node 15 has a partner link with node 14 and directly connects to nodes 4, 7, 9, and 11. A deadlock-free routing table for this network topology is provided below.

|  | | | | | | | | TO | | | | | | | | |
|---|---|---|---|---|---|---|---|---|---|---|---|---|---|---|---|---|
| FROM | 0 | 1 | 2 | 3 | 4 | 5 | 6 | 7 | 8 | 9 | 10 | 11 | 12 | 13 | 14 | 15 |
| 0 | — | — | 4 | 8 | — | 4 | — | 6 | — | 8 | 11 | — | 4 | 6 | 8 | 4 |
| 1 | — | — | 9 | 5 | 5 | — | 7 | — | 9 | — | — | 10 | 7 | 5 | 5 | 9 |
| 2 | 6 | 10 | — | — | — | 4 | — | 6 | 9 | — | — | 10 | 10 | 6 | 6 | 4 |
| 3 | 11 | 7 | — | — | 5 | — | 7 | — | — | 8 | 11 | — | 7 | 11 | 5 | 7 |
| 4 | — | 0 | — | 2 | — | — | 0 | 12 | 0 | 2 | 12 | 0 | — | 12 | 15 | — |
| 5 | 1 | — | 3 | — | — | — | 13 | 1 | 3 | 1 | 1 | 13 | 13 | — | — | 14 |
| 6 | — | 0 | — | 2 | 2 | 14 | — | — | 14 | 2 | 2 | 0 | 13 | — | — | 14 |
| 7 | 1 | — | 3 | — | 15 | 3 | — | — | 3 | 15 | 1 | 3 | — | 12 | 15 | — |
| 8 | — | 0 | 3 | — | 12 | 14 | 0 | 12 | — | — | 12 | 0 | — | 12 | — | 14 |
| 9 | 1 | — | — | 2 | 15 | 13 | 13 | 1 | — | — | 1 | 13 | 13 | — | 15 | — |
| 10 | 1 | — | — | 2 | 2 | 14 | 14 | 12 | 14 | 2 | — | — | — | 12 | — | 14 |
| 11 | — | 0 | 3 | — | 15 | 3 | 13 | 15 | 3 | 15 | — | — | 13 | — | 15 | — |
| 12 | 8 | 10 | 4 | 8 | — | 4 | 7 | — | — | 8 | — | 10 | — | — | 8 | 4 |
| 13 | 11 | 9 | 9 | 5 | 5 | — | — | 6 | 9 | — | 11 | — | — | — | 5 | 9 |
| 14 | 6 | 10 | 10 | 8 | 5 | — | — | 6 | — | 8 | — | 10 | 10 | 6 | — | — |
| 15 | 11 | 7 | 9 | 11 | — | 4 | 7 | — | 9 | — | 11 | — | 7 | 11 | — | — |

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method in a distributed system, comprising:
   providing a network containing at least seven nodes, including a node 0, a node 1, a node 2, a node 3, a node 4, a node 5, and a node 6; and
   routing packets through the network to prevent deadlock based on at least one of the following routing configurations:

(i) routing packets directly from node 0 to one of nodes 1 and 3–6, and indirectly to node 2 through node 3, (ii) routing packets directly from node 1 to one of nodes 0 and 2–5, and indirectly to node 6 through node 4, (iii) routing packets directly from node 2 to one of nodes 1 and 3–6, and indirectly to node 0 through node 1, (iv) routing packets directly from node 3 to one of nodes 0–2, 5, and 6, and indirectly to node 4 through node 5, (v) routing packets directly from node 4 to one of nodes 0–2, 5, and 6, and indirectly to node 3 through node 2, (vi) routing packets directly from node 5 to one of nodes 1–4, and indirectly to node 6 through node 3, and (vii) routing packets directly from node 6 to one of nodes 0 and 2–4, and indirectly to node 1 through node 0 and to node 5 through node 4.

2. A method in a distributed system, comprising:

providing a network containing at least eight nodes, including a node 0, a node 1, a node 2, a node 3, a node 4, a node 5, a node 6, and a node 7; and routing packets through the network to prevent deadlock based on at least one of the following routing configurations:

(i) routing packets directly from node 0 to one of nodes 1 and 3–6, and indirectly to node 2 through node 3 and to node 7 through node 6, (ii) routing packets directly from node 1 to one of nodes 0, 2, 4, 5, and 7, and indirectly to node 3 through node 2 and to node 6 through node 7, (iii) routing packets directly from node 2 to one of nodes 1, 3, 4, 6, and 7, and indirectly to node 0 through node 1 and to node 5 through node 4, (iv) routing packets directly from node 3 to one of nodes 0, 2, and 5–7, and indirectly to node 1 through node 0 and to node 4 through node 5, (v) routing packets directly from node 4 to one of nodes 0–2, 5, and 6, and indirectly to node 3 through node 2 and to node 7 through node 6, (vi) routing packets directly from node 5 to one of nodes 0, 1, 3, 4, and 7, and indirectly to node 2 through node 3 and to node 6 through node 7, (vii) routing packets directly from node 6 to one of nodes 0, 2–4, and 7, and indirectly to node 1 through node 0 and to node 5 through node 4, and (viii) routing packets directly from node 7 to one of nodes 1–3 and 5, 6, and indirectly to node 0 through node 1 and to node 4 through node 5.

3. A method in a distributed system, comprising:

providing a network containing at least nine nodes, including a node 0, a node 1, a node 2, a node 3, a node 4, a node 5, a node 6, a node 7, and a node 8; and routing packets through the network to prevent deadlock based on at least one of the following routing configurations:

(i) routing packets directly from node 0 to one of nodes 1, 3, 4, 6, and 8, and indirectly to node 2 through node 3, to node 5 through node 4, and to node 7 through node 6, (ii) routing packets directly from node 1 to one of nodes 0, 2, 4, 5, and 7, and indirectly to node 3 through node 2, to node 6 through node 7, and to node 8 through node 5, (iii) routing packets directly from node 2 to one of nodes 1, 3, 4, 6, and 7, and indirectly to node 0 through node 1, to node 5 through node 4 and to node 8 through node 6, (iv) routing packets directly from node 3 to one of nodes 0, 2, 5, 7, and 8, and indirectly to node 1 through node 0, to node 4 through node 5, and to node 6 through node 7, (v) routing packets directly from node 4 to one of nodes 0–2, 5, and 6, and indirectly to node 3 through node 2, to node 7 through node 6, and to node 8 through node 0, (vi) routing packets directly from node 5 to one of nodes 1, 3, 4, 7, and 8, and indirectly to node 0 through node 1, to node 2 through node 3, and to node 6 through node 7, (vii) routing packets directly from node 6 to one of nodes 0, 2, 4, 7, and 8, and indirectly to node 1 through node 0, to node 3 through node 2, and to node 5 through node 4, (viii) routing packets directly from node 7 to one of nodes 1–3 and 5, 6, and indirectly to node 0 through node 1, to node 4 through node 5, and to node 8 through node 3, and (ix) routing packets directly from node 8 to one of nodes 0, 3, 5, and 6, and indirectly to node 1 through node 0, to node 2 through node 3, to node 4 through node 5, and to node 7 through node 6.

4. A method in a distributed system, comprising:

providing a network containing at least ten nodes, including a node 0, a node 1, a node 2, a node 3, a node 4, a node 5, a node 6, a node 7, a node 8, and a node 9; and routing packets through the network to prevent deadlock based on at least one of the following routing configurations:

(i) routing packets directly from node 0 to one of nodes 1, 3, 4, 6, and 8, and indirectly to node 2 through node 3, to node 5 through node 4, to node 7 through node 6, and to node 9 through node 8, (ii) routing packets directly from node 1 to one of nodes 0, 2, 5, 7, and 9, and indirectly to node 3 through node 2, to node 4 through node 5, to node 6 through node 7, and to node 8 through node 9, (iii) routing packets directly from node 2 to one of nodes 1, 3, 4, 6, and 9, and indirectly to node 0 through node 1, to node 5 through node 4, to node 7 through node 6, and to node 8 through node 9, (iv) routing packets directly from node 3 to one of nodes 0, 2, 5, 7, and 8, and indirectly to node 1 through node 0, to node 4 through node 5, to node 6 through node 7, and to node 9 through node 8, (v) routing packets directly from node 4 to one of nodes 0, 2, 5, 6, and 9, and indirectly to node 1 through node 0, to node 3 through node 2, to node 7 through node 6, and to node 8 through node 9, (vi) routing packets directly from node 5 to one of nodes 1, 3, 4, 7, and 8, and indirectly to node 0 through node 1, to node 2 through node 3, to node 6 through node 7, and to node 9 through node 8, (vii) routing packets directly from node 6 to one of nodes 0, 2, 4, 7, and 8, and indirectly to node 1 through node 0, to node 3 through node 2, to node 5 through node 4, and to node 9 through node 8, (viii) routing packets directly from node 7 to one of nodes 1, 3, 5, 6, and 9, and indirectly to node 0 through node 1, to node 2 through node 3, to node 4 through node 5, and to node 8 through node 9, (ix) routing packets directly from node 8 to one of nodes 0, 3, 5, 6, and 9, and indirectly to node 1 through node 0, to node 2 through node 3, to node 4 through node 5, and to node 7 through node 6, and
(x) routing packets directly from node 9 to one of nodes 1, 2, 4, 7, and 8, and indirectly to node 0 through node 1, to node 3 through node 2, to node 5 through node 4, and to node 6 through node 7.

5. A method in a distributed system, comprising:
providing a network containing at least eleven nodes, including a node 0, a node 1, a node 2, a node 3, a node 4, a node 5, a node 6, a node 7, a node 8, a node 9, and a node 10; and
routing packets through the network to prevent deadlock based on at least one of the following routing configurations:
(i) routing packets directly from node 0 to one of nodes 1, 3, 4, 6, and 8, and indirectly to node 2 through node 3, to node 5 through node 4, to node 7 through node 6, to node 9 through node 8, and to node 10 through node 6,
(ii) routing packets directly from node 1 to one of nodes 0, 5, 7, 9, and 10, and indirectly to node 2 through node 9, to node 3 through node 5, to node 4 through node 5, to node 6 through node 7, and to node 8 through node 9,
(iii) routing packets directly from node 2 to one of nodes 3, 4, 6, 9, and 10, and indirectly to node 0 through node 6, to node 1 through node 10, to node 5 through node 4, to node 7 through node 6, and to node 8 through node 9,
(iv) routing packets directly from node 3 to one of nodes 0, 2, 5, 7, and 8, and indirectly to node 1 through node 0, to node 4 through node 5, to node 6 through node 7, to node 9 through node 8, and to node 10 through node 5,
(v) routing packets directly from node 4 to one of nodes 0, 2, 5, 7, and 9, and indirectly to node 1 through node 0, to node 3 through node 2, to node 6 through node 7, to node 8 through node 9, and to node 10 through node 2,
(vi) routing packets directly from node 5 to one of nodes 1, 3, 4, 7, 8, and 10, and indirectly to node 0 through node 1, to node 2 through node 3, to node 6 through node 8, to node 7 through node 1, and to node 9 through node 8,
(vii) routing packets directly from node 6 to one of nodes 0, 2, 7, 8, and 10, and indirectly to node 1 through node 0, to node 3 through node 2, to node 4 through node 2, to node 5 through node 8, and to node 9 through node 8,
(viii) routing packets directly from node 7 to one of nodes 1, 3, 4, 6, and 9, and indirectly to node 0 through node 1, to node 2 through node 3, to node 5 through node 4, to node 8 through node 9, and to node 10 through node 1,
(ix) routing packets directly from node 8 to one of nodes 0, 3, 5, 6, and 9, and indirectly to node 1 through node 0, to node 2 through node 3, to node 4 through node 5, to node 7 through node 6, and to node 10 through node 6,
(x) routing packets directly from node 9 to one of nodes 1, 2, 4, 7, and 8, and indirectly to node o through node 1, to node 3 through node 2, to node 5 through node 4, to node 6 through node 7, and to node 10 through node 1, and
(xi) routing packets directly from node 10 to one of nodes 1, 2, 5, and 6, and indirectly to node 0 through node 1, to node 3 through node 2, to node 4 through node 5, to node 7 through node 6, to node 8 through node 6, and to node 9 through node 2.

6. A method in a distributed system, comprising:
providing a network containing at least twelve nodes, including a node 0, a node 1, a node 2, a node 3, a node 4, a node 5, a node 6, a node 7, a node 8, a node 9, a node 10, and a node 11; and
routing packets through the network to prevent deadlock based on at least one of the following routing configurations:
(i) routing packets directly from node 0 to one of nodes 1, 4, 6, 8, and 11, and indirectly to node 2 through node 4, to node 3 through node 8, to node 5 through node 4, to node 7 through node 6, to node 9 through node 8, and to node 10 through node 11,
(ii) routing packets directly from node 1 to one of nodes 0, 5, 7, 9, and 10, and indirectly to node 2 through node 9, to node 3 through node 5, to node 4 through node 5, to node 6 through node 7, to node 8 through node 9, and to node 11 through node 10,
(iii) routing packets directly from node 2 to one of nodes 3, 4, 6, 9, and 10, and indirectly to node 0 through node 6, to node 1 through node 10, to node 5 through node 4, to node 7 through node 6, to node 8 through node 9, and to node 11 through node 10,
(iv) routing packets directly from node 3 to one of nodes 2, 5, 7, 8, and 11, and indirectly to node 0 through node 11, to node 1 through node 7, to node 4 through node 5, to node 6 through node 7, to node 9 through node 8, and to node 10 through node 11,
(v) routing packets directly from node 4 to one of nodes 0, 2, 5, 9, and 11, and indirectly to node 1 through node 0, to node 3 through node 2, to node 6 through node 0, to node 7 through node 9, to node 8 through node 9, and to node 10 through node 11,
(vi) routing packets directly from node 5 to one of nodes 1, 3, 4, 8, and 10, and indirectly to node 0 through node 1, to node 2 through node 3, to node 6 through node 10, to node 7 through node 1, to node 9 through node 8, and to node 11 through node 10,
(vii) routing packets directly from node 6 to one of nodes 0, 2, 7, 8, and 10, and indirectly to node 1 through node 0, to node 3 through node 2, to node 4 through node 2, to node 5 through node 10, to node 9 through node 8, and to node 11 through node 10,
(viii) routing packets directly from node 7 to one of nodes 1, 3, 6, 9, and 11, and indirectly to node 0 through node 1, to node 2 through node 3, to node 4 through node 9, to node 5 through node 3, to node 8 through node 9, and to node 10 through node 11,
(ix) routing packets directly from node 8 to one of nodes 0, 3, 5, 6, and 9, and indirectly to node 1 through node 0, to node 2 through node 3, to node 4 through node 5, to node 7 through node 6, to node 10 through node 5, and to node 11 through node 0,
(x) routing packets directly from node 9 to one of nodes 1, 2, 4, 7, and 8, and indirectly to node 0 through node 1, to node 3 through node 2, to node 5 through node 4, to node 6 through node 7, to node 10 through node 1, and to node 11 through node 7,
(xi) routing packets directly from node 10 to one of nodes 1, 2, 5, 6, and 11, and indirectly to node 0 through node 1, to node 3 through node 2, to node 4 through node 5, to node 7 through node 6, to node 8 through node 5, and to node 9 through node 2, and
(xii) routing packets directly from node 11 to one of nodes 0, 3, 4, 7, and 10, and indirectly to node 1 through node 0, to node 2 through node 3, to node 5 through node 4, to node 6 through node 7, to node 8 through node 3, and to node 9 through node 7.

7. A method in a distributed system, comprising:

providing a network containing at least thirteen nodes, including a node 0, a node 1, a node 2, a node 3, a node 4, a node 5, a node 6, a node 7, a node 8, a node 9, a node 11, and a node 12; and routing packets through the network to prevent deadlock based on at least one of the following routing configurations:

(i) routing packets directly from node 0 to one of nodes 1, 4, 6, 8, and 11, and indirectly to node 2 through node 4, to node 3 through node 8, to node 5 through node 4, to node 7 through node 6, to node 9 through node 8, to node 10 through node 11, and to node 12 through node 4, (ii) routing packets directly from node 1 to one of nodes 0, 5, 7, 9, and 10, and indirectly to node 2 through node 9, to node 3 through node 5, to node 4 through node 5, to node 6 through node 7, to node 8 through node 9, to node 11 through node 10, and to node 12 through node 7, (iii) routing packets directly from node 2 to one of nodes 3, 4, 6, 9, and 10, and indirectly to node 0 through node 6, to node 1 through node 10, to node 5 through node 4, to node 7 through node 6, to node 8 through node 9, to node 11 through node 10, and to node 12 though node 10, (iv) routing packets directly from node 3 to one of nodes 2, 5, 7, 8, and 11, and indirectly to node 0 through node 11, to node 1 through node 7, to node 4 through node 5, to node 6 through node 7, to node 9 through node 8, to node 10 through node 11, and to node 12 through node 7, (v) routing packets directly from node 4 to one of nodes 0, 2, 5, 9, and 12, and indirectly to node 1 through node 0, to node 3 through node 2, to node 6 through node 0, to node 7 through node 12, to node 8 through node 9, to node 10 through node 12, to node 11 through node 0, (vi) routing packets directly from node 5 to one of nodes 1, 3, 4, 6, and 8, and indirectly to node 0 through node 1, to node 2 through node 3, to node 7 through node 6, to node 9 through node 8, to node 10 through node 1, to node 11 through node 3, and to node 12 through node 8, (vii) routing packets directly from node 6 to one of nodes 0, 2, 5, 7, and 10, and indirectly to node 1 through node 0, to node 3 through node 2, to node 4 through node 5, to node 8 through node 0, to node 9 through node 2, to node 11 through node 10, and to node 12 through node 10, (viii) routing packets directly from node 7 to one of nodes 1, 3, 6, 11, and 12, and indirectly to node 0 through node 1, to node 2 through node 3, to node 4 through node 12, to node 5 through node 3, to node 8 through node 3, to node 9 through node 11, and to node 10 through node 11, (ix) routing packets directly from node 8 to one of nodes 0, 3, 5, 9, and 12, and indirectly to node through node 0, to node 2 through node 3, to node 4 through node 5, to node 6 through node 0, to node 7 through node 12, to node 10 through node 12, and to node 11 through node 0, (x) routing packets directly from node 9 to one of nodes 1, 2, 4, 8, and 11, and indirectly to node 0 through node 1, to node 3 through node 2, to node 5 through node 4, to node 6 through node 2, to node 7 through node 1, to node 10 through node 11, and to node 12 through node 4, (xi) routing packets directly from node 10 to one of nodes 1, 2, 6, 11, and 12, and indirectly to node 0 through node 1, to node 3 through node 2, to node 4 through node 2, to node 5 through node 6, to node 7 through node 6, to node 8 through node 12, and to node 9 through node 2, (xii) routing packets directly from node 11 to one of nodes 0, 3, 7, 9, and 10, and indirectly to node 1 through node 0, to node 2 through node 3, to node 4 through node 0, to node 5 through node 3, to node 6 through node 7, to node 8 through node 9, and to node 12 through node 7, and (xiii) routing packets directly from node 12 to one of nodes 4, 7, 8, and 10, and indirectly to node 0 through node 8, to node 1 through node 10, to node 2 through node 4, to node 3 through node 8, to node 5 through node 7, to node 6 through node 7, to node 9 through node 8, and to node 11 through node 10.

8. A method in a distributed system, comprising:

providing a network containing at least fourteen nodes, including a node 0, a node 1, a node 2, a node 3, a node 4, a node 5, a node 6, a node 7, a node 8, a node 9, a node 11, a node 12, and a node 13; and routing packets through the network to prevent deadlock based on at least one of the following routing configurations:

(i) routing packets directly from node 0 to one of nodes 1, 4, 6, 8, and 11, and indirectly to node 2 through node 4, to node 3 through node 8, to node 5 through node 4, to node 7 through node 6, to node 9 through node 8, to node 10 through node 11, to node 12 through node 8, and to node 13 through node 6, (ii) routing packets directly from node 1 to one of nodes 0, 5, 7, 9, and 10, and indirectly to node 2 through node 9, to node 3 through node 5, to node 4 through node 5, to node 6 through node 7, to node 8 through node 9, to node 11 through node 10, to node 12 through node 7, and to node 13 through node 5, (iii) routing packets directly from node 2 to one of nodes 3, 4, 6, 9, and 10, and indirectly to node 0 through node 6, to node 1 through node 10, to node 5 through node 4, to node 7 through node 6, to node 8 through node 9, to node 11 through node 10, to node 12 though node 10, and to node 13 through node 6, (iv) routing packets directly from node 3 to one of nodes 2, 5, 7, 8, and 11, and indirectly to node 0 through node 11, to node 1 through node 7, to node 4 through node 5, to node 6 through node 7, to node 9 through node 8, to node 10 through node 11, to node 12 through node 7, and to node 13 through node 11, (v) routing packets directly from node 4 to one of nodes 0, 2, 5, 9, and 12, and indirectly to node 1 through node 0, to node 3 through node 2, to node 6 through node 0, to node 7 through node 12, to node 8 through node 9, to node 10 through node 12, to node 11 through node 0, and to node 13 through node 12, (vi) routing packets directly from node 5 to one of nodes 1, 3, 4, 8, and 13, and indirectly to node 0 through node 1, to node 2 through node 3, to node 6 through node 13, to node 7 through node 1, to node 9 through node 8, to node 10 through node 1, to node 11 through node 13, and to node 12 through node 13, (vii) routing packets directly from node 6 to one of nodes 0, 2, 7, 10, and 13, and indirectly to node 1 through node 0, to node 3 through node 2, to node 4 through node 2, to node 5 through node 13, to node 8 through node 0, to node 9 through node 2, to node 11 through node 10, and to node 12 through node 13, (viii) routing packets directly from node 7 to one of nodes 1, 3, 6, 11, and 12, and indirectly to node 0 through node 1, to node 2 through node 3, to node 4 through node 12, to node 5 through node 3, to node 8 through node 3, to node 9 through node 1, to node 10 through node 11, and to node 13 through node 12, (ix) routing packets directly from node 8 to one of nodes 0, 3, 5, 9, and 12, and indirectly to node 1 through node 0, to node 2 through node 3, to node 4 through node 5, to node 6 through node 0, to node 7 through node 12, to node 10 through node 12, to node 11 through node 0, and to node 13 through node 12, (x) routing packets directly from node 9 to one of nodes 1, 2, 4, 8, and 13, and indirectly to node 0 through node 1, to node 3 through node 2, to node 5 through node 4, to node 6 through node 13, to node 7 through node 1, to node 10 through node 1, to node 11 through node 13, and to node 12 through node 13, (xi) routing packets directly from node 10 to one of nodes 1, 2, 6, 11, and 12, and indirectly to node 0 through node 1, to node 3 through node 2, to node 4 through node 2, to node 5 through node 1, to node 7 through node 6, to node 8 through node 12, to node 9 through node 2, and to node 13 through node 12, (xii) routing packets directly from node 11 to one of nodes 0, 3, 7, 10, and 13, and indirectly to node 1 through node 0, to node 2 through node 3, to node 4 through node 0, to node 5 through node 3, to node 6 through node 7, to node 8 through node 3, to node 9 through node 3, to node 12 through node 13, (xiii) routing packets directly from node 12 to one of nodes 4, 7, 8, 10, and 13, and indirectly to node 0 through node 8, to node 1 through node 10, to node 2 through node 4, to node 3 through node 8, to node 5 through node 4, to node 6 through node 7, to node 9 through node 8, and to node 11 through node 10, and (xiv) routing packets directly from node 13 to one of nodes 5, 6, 9, 11, and 12, and indirectly to node 0 through node 11, to node 1 through node 9, to node 2 through node 9, to node 3 through node 5, to node 4 through node 5, to node 7 through node 6, to node 8 through node 9, and to node 10 through node 11.

9. A method in a distributed system, comprising:

providing a network containing at least fifteen nodes, including a node 0, a node 1, a node 2, a node 3, a node 4, a node 5, a node 6, a node 7, a node 8, a node 9, a node 10, a node 11 a node 12, a node 13, and a node 14; and routing packets through the network to prevent deadlock based on at least one of the following routing configurations:

(i) routing packets directly from node 0 to one of nodes 1, 4, 6, 8, and 11, and indirectly to node 2 through node 4, to node 3 through node 8, to node 5 through node 4, to node 7 through node 6, to node 9 through node 8, to node 10 through node 11, to node 12 through node 4, to node 13 through node 6, and to node 14 through node 8, (ii) routing packets directly from node 1 to one of nodes 0, 5, 7, 9, and 10, and indirectly to node 2 through node 9, to node 3 through node 5, to node 4 through node 5, to node 6 through node 7, to node 8 through node 9, to node 11 through node 10, to node 12 through node 7, to node 13 through node 5, and to node 14 through node 5, (iii) routing packets directly from node 2 to one of nodes 3, 4, 6, 9, and 10, and indirectly to node 0 through node 6, to node 1 through node 10, to node 5 through node 4, to node 7 through node 6, to node 8 through node 9, to node 11 through node 10, to node 12 though node 10, to node 13 through node 6, and to node 14 through node 6, (iv) routing packets directly from node 3 to one of nodes 2, 5, 7, 8, and 11, and indirectly to node 0 through node 11, to node 1 through node 7, to node 4 through node 5, to node 6 through node 7, to node 9 through node 8, to node 10 through node 11, to node 12 through node 7, to node 13 through node 11, and to node 14 through node 5, (v) routing packets directly from node 4 to one of nodes 0, 2, 5, 9, and 12, and indirectly to node 1 through node 0, to node 3 through node 2, to node 6 through node 0, to node 7 through node 12, to node 8 through node 9, to node 10 through node 12, to node 11 through node 0, to node 13 through node 12, and to node 14 through node 5, (vi) routing packets directly from node 5 to one of nodes 1, 3, 4, 13, and 14, and indirectly to node 0 through node 1, to node 2 through node 3, to node 6 through node 13, to node 7 through node 1, to node 8 through node 3, to node 9 through node 1, to node 10 through node 1, to node 11 through node 13, and to node 12 through node 13, (vii) routing packets directly from node 6 to one of nodes 0, 2, 7, 13, and 14, and indirectly to node 1 through node 0, to node 3 through node 2, to node 4 through node 2, to node 5 through node 14, to node 8 through node 14, to node 9 through node 2, to node 10 through node 2, to node 11 through node 0, and to node 12 through node 13, (viii) routing packets directly from node 7 to one of nodes 1, 3, 6, 11, and 12, and indirectly to node 0 through node 1, to node 2 through node 3, to node 4 through node 12, to node 5 through node 3, to node 8 through node 3, to node 9 through node 1, to node 10 through node 11, to node 13 through node 12, and to node 14 through node 6, (ix) routing packets directly from node 8 to one of nodes 0, 3, 9,12, and 14, and indirectly to node 1 through node 0, to node 2 through node 3, to node 4 through node 12, to node 5 through node 14, to node 6 through node 0, to node 7 through node 12, to node 10 through node 12, to node 11 through node 0, and to node 13 through node 12, (x) routing packets directly from node 9 to one of nodes 1, 2, 4, 8, and 13, and indirectly to node 0 through node 1, to node 3 through node 2, to node 5 through node 4, to node 6 through node 13, to node 7 through node 1, to node 10 through node 1, to node 11 through node 13, to node 12 through node 13, and to node 14 through node 8, (xi) routing packets directly from node 10 to one of nodes 1, 2, 11, 12, and 14, and indirectly to node 0 through node 1, to node 3 through node 2, to node 4 through node 2, to node 5 through node 14, to node 6 through node 2, to node 7 through 12, to node 8 through node 14, to node 9 through node 2, and to node 13 through node 12, (xii) routing packets directly from node 11 to one of nodes 0, 3, 7, 10, and 13, and indirectly to node 1 through node 0, to node 2 through node 3, to node 4 through node 0, to node 5 through node 3, to node 6 through node 7, to node 8 through node 3, to node 9 through node 13, to node 12 through node 13, and to node 14 through node 10, (xiii) routing packets directly from node 12 to one of nodes 4, 7, 8, 10, and 13, and indirectly to node 0 through node 8, to node 1 through node 10, to node 2 through node 4, to node 3 through node 8, to node 5 through node 4, to node 6 through node 7, to node 9 through node 8, to node 11 through node 10, and to node 14 through node 8, (xiv) routing packets directly from node 13 to one of nodes 5, 6, 9, 11, and 12, and indirectly to node 0 through node 11, to node 1 through node 9, to node 2 through node 9, to node 3 through node 5, to node 4 through node 5, to node 7 through node 6, to node 8 through node 9, to node 10 through node 11, and to node 14 through node 5, and (xv) routing packets directly from node 14 to one of nodes 5, 6, 8, and 10, and indirectly to node 0 through node 6, to node 1 through node 10, to node 2 through node 10, to node 3 through node 8, to node 4 through node 5, to node 7 through node 6, to node 9 through node 8, to node 11 through node 10, to node 12 through node 10, and to node 13 through node 6.

10. A method in a distributed system, comprising:

providing a network containing at least sixteen nodes, including a node 0, a node 1, a node 2, a node 3, a node 4, a node 5, a node 6, a node 7, a node 8, a node 9, a node 10, a node 11, a node 12, a node 13, a node 14, and a node 15; and routing packets through the network to prevent deadlock based on at least one of the following routing configurations:

(i) routing packets directly from node 0 to one of nodes 1, 4, 6, 8, and 11, and indirectly to node 2 through node 4, to node 3 through node 8, to node 5 through node 4, to node 7 through node 6, to node 9 through node 8, to node 10 through node 11, to node 12 through node 4, to node 13 through node 6, to node 14 through node 8, and to node 15 through node 4, (ii) routing packets directly from node 1 to one of nodes 0, 5, 7, 9, and 10, and indirectly to node 2 through node 9, to node 3 through node 5, to node 4 through node 5, to node 6 through node 7, to node 8 through node 9, to node 11 through node 10, to node 12 through node 7, to node 13 through node 5, to node 14 through node 5, and to node 15 through node 9, (iii) routing packets directly from node 2 to one of nodes 3, 4, 6, 9, and 10, and indirectly to node 0 through node 6, to node 1 through node 10, to node 5 through node 4, to node 7 through node 6, to node 8 through node 9, to node 11 through node 10, to node 12 though node 10, to node 13 through node 6, to node 14 through node 6, and to node 15 through node 4, (iv) routing packets directly from node 3 to one of nodes 2, 5, 7, 8, and 11, and indirectly to node 0 through node 11, to node 1 through node 7, to node 4 through node 5, to node 6 through node 7, to node 9 through node 8, to node 10 through node 11, to node 12 through node 7, to node 13 through node 11, to node 14 through node 5, and to node 15 through node 7, (v) routing packets directly from node 4 to one of nodes 0, 2, 5, 12, and 15, and indirectly to node 1 through node 0, to node 3 through node 2, to node 6 through node 0, to node 7 through node 12, to node 8 through node 0, to node 9 through node 2, to node 10 through node 12, to node 11 through node 0, to node 13 through node 12, and to node 14 through node 15, (vi) routing packets directly from node 5 to one of nodes 1, 3, 4, 13, and 14, and indirectly to node 0 through node 1, to node 2 through node 3, to node 6 through node 13, to node 7 through node 1, to node 8 through node 3, to node 9 through node 1, to node 10 through node 1, to node 11 through node 13, to node 12 through node 13, and to node 15 through node 14, (vii) routing packets directly from node 6 to one of nodes 0, 2, 7, 13, and 14, and indirectly to node 1 through node 0, to node 3 through node 2, to node 4 through node 2, to node 5 through node 14, to node 8 through node 14, to node 9 through node 2, to node 10 through node 2, to node 11 through node 0, to node 12 through node 13, and to node 15 through node 14, (viii) routing packets directly from node 7 to one of nodes 1, 3, 6, 12, and 15, and indirectly to node 0 through node 1, to node 2 through node 3, to node 4 through node 15, to node 5 through node 3, to node 8 through node 3, to node 9 through node 15, to node 10 through node 1, to node 11 through node 3, to node 13 through node 12, and to node 14 through node 15, (ix) routing packets directly from node 8 to one of nodes 0, 3, 9, 12, and 14, and indirectly to node 1 through node 0, to node 2 through node 3, to node 4 through node 12, to node 5 through node 14, to node 6 through node 0, to node 7 through node 12, to node 10 through node 12, to node 11 through node 0, to node 13 through node 12, and to node 15 through node 14, (x) routing packets directly from node 9 to one of nodes 1, 2, 8, 13, and 15, and indirectly to node 0 through node 1, to node 3 through node 2, to node 4 through node 15, to node 5 through node 13, to node 6 through node 13, to node 7 through node 1, to node 10 through node 1, to node 11 through node 13, to node 12 through node 13, and to node 14 through node 15, (xi) routing packets directly from node 10 to one of nodes 1, 2, 11, 12, and 14, and indirectly to node 0 through node 1, to node 3 through node 2, to node 4 through node 2, to node 5 through node 14, to node 6 through node 14, to node 7 through 12, to node 8 through node 14, to node 9 through node 2, to node 13 through node 12, and to node 15 through node 14, (xii) routing packets directly from node 11 to one of nodes 0, 3, 10, 13, and 15, and indirectly to node 1 through node 0, to node 2 through node 3, to node 4 through node 15, to node 5 through node 3, to node 6 through node 13, to node 7 through node 15, to node 8 through node 3, to node 9 through node 15, to node 12 through node 13, and to node 14 through node 15, (xiii) routing packets directly from node 12 to one of nodes 4, 7, 8, 10, and 13, and indirectly to node 0 through node 8, to node 1 through node 10, to node 2 through node 4, to node 3 through node 8, to node 5 through node 4, to node 6 through node 7, to node 9 through node 8, to node 11 through node 10, to node 14 through node 8, and to node 15 through node 4, (xiv) routing packets directly from node 13 to one of nodes 5, 6, 9, 11, and 12, and indirectly to node 0 through node 11, to node 1 through node 9, to node 2 through node 9, to node 3 through node 5, to node 4 through node 5, to node 7 through node 6, to node 8 through node 9, to node 10 through node 11, to node 14 through node 5, and to node 15 through node 9, (xv) routing packets directly from node 14 to one of nodes 5, 6, 8, 10, and 15, and indirectly to node 0 through node 6, to node 1 through node 10, to node 2 through node 10, to node 3 through node 8, to node 4 through node 5, to node 7 through node 6, to node 9 through node 8, to node 11 through node 10, to node 12 through node 10, to node 13 through node 6, and (xvi) routing packets directly from node 15 to one of nodes 4, 7, 9, 11, and 13, and indirectly to node 0 through node 11, to node 1 through node 7, to node 2 through node 9, to node 3 through node 11, to node 5 through node 4, to node 6 through node 7, to node 8 through node 9, to node 10 through node 11, to node 12 through node 7, to node 13 through node 11.

\* \* \* \* \*

UNITED STATES PATENT AND TRADEMARK OFFICE
CERTIFICATE OF CORRECTION

PATENT NO. : 6,567,856 B1
DATED : May 20, 2003
INVENTOR(S) : Guy L. Steele, Jr. et al.

It is certified that error appears in the above-identified patent and that said Letters Patent is hereby corrected as shown below:

<u>Title page,</u>
Item [75], Inventors, "Chelmsford," should read -- Action, --.

<u>Column 15,</u>
Line 61, "node o" should read -- node 0 --;

<u>Column 17,</u>
Line 7, after "a node 9," insert -- a node 10, --;
Line 29, "though" should read -- through --;
Lines 61-62, "node through" should read -- node 1 through --;

<u>Column 18,</u>
Line 25, after "a node 9," insert -- a node 10, --;
Line 47, "though" should read -- through --;

<u>Column 20,</u>
Line 11, "though" should read -- through --;
Line 48, "0, 3, 9, 12," should read -- 0, 3, 9, 12, --;
Line 65, "through 12," should read -- through node 12, --;

<u>Column 21,</u>
Line 57, "though" should read -- through --; and

<u>Column 22,</u>
Line 52, "through 12," should read -- through node 12, --.

Signed and Sealed this

Second Day of September, 2003

JAMES E. ROGAN
*Director of the United States Patent and Trademark Office*